(12) United States Patent
Garland et al.

(10) Patent No.: US 6,661,881 B1
(45) Date of Patent: Dec. 9, 2003

(54) METHOD AND SYSTEM FOR CONTROLLING FUNCTIONAL CAPABILITIES OF A TELEPHONIC SWITCH EMPLOYING CONTROL AND STATUS MESSAGES

(75) Inventors: Stuart Mandel Garland, Morton Grove, IL (US); David B. Smith, Hinsdale, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/504,562

(22) Filed: Feb. 15, 2000

(51) Int. Cl.[7] .......................... H04M 11/00; H04M 3/42
(52) U.S. Cl. ............................ 379/106.09; 379/201.03
(58) Field of Search ................. 379/93.01, 93.06–93.07, 379/93.11, 100.03, 106.03, 106.05–106.09, 133, 156–157, 166, 201.02–201.03, 211.02, 221.01

(56) References Cited

U.S. PATENT DOCUMENTS

| | | | | |
|---|---|---|---|---|
| 5,189,694 A | | 2/1993 | Garland | |
| 5,509,054 A | | 4/1996 | Garland | |
| 5,544,236 A | * | 8/1996 | Andruska et al. | 379/201.02 |
| 5,588,037 A | * | 12/1996 | Fuller et al. | 379/211.02 |
| 6,016,339 A | * | 1/2000 | Hoy et al. | 379/106.07 |
| 6,029,047 A | * | 2/2000 | Ishida et al. | 379/93.07 |
| 6,219,409 B1 | * | 4/2001 | Smith et al. | 379/106.03 |
| 6,304,651 B1 | * | 10/2001 | Cramer et al. | 379/221.01 |

* cited by examiner

*Primary Examiner*—George Eng

(57) ABSTRACT

A system and method enabling a remote customer station (server, CPE or end user) to control, or modify, selected functional capabilities of a telephone switch via control messages sent after cell setup and during the course of a data stream. The customer station receives back from the telephone switch indications of modifications in status of the switch occurring in response to the control messages. The functional capabilities which may be modified include both software and hardware configurations of the telephone switch.

51 Claims, 30 Drawing Sheets

METHOD AND SYSTEM FOR CONTROLLING FUNCTIONAL CAPABILITIES OF A TELEPHONIC SWITCH EMPLOYING CONTROL AND STATUS MESSAGES

BACKGROUND OF THE INVENTION

This invention generally relates to a method and system for providing communications between a server or a remote customer station and a telephone switch that allows a server or customer station to control functionality of the telephone switch and receive status and confirmation information from the telephone switch.

This section is intended to introduce the reader to various aspects of art that may be related to the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Suppressed ringing communication methods allow for a variety of data communications applications between an enhanced service provider, or server, and customer premises equipment, (CPE), generally a customer computer or similar electronic device or telephone. However, these known communication methods and systems have disadvantages because the network and data capability between the server or the CPE and the telephone switch is configured to meet the needs of the server or the CPE at the time the service is established (service provisioning) or during the call set up. There is no way to dynamically change this configuration during the call. Changing the communications configuration is even more challenging if the service provider is not local to the server, creating operational difficulties.

The data communication capabilities between the server and the CPE are defined by the server and telephone switch when the service is initially set up. Unfortunately, the needs of the server or of the CPE frequently change over time or may change in real time as a result of the application. Currently, changes are made manually in response to oral or written requests to the telephone company that controls the network switch. However, this method is cumbersome, inefficient and prone to human error and delay. It is also not responsive to real time events that may require immediate changes in the operations.

Suppressed ringing communication methods between a service provider and an end user are known in the art. For example, a suppressed ringing communication method for communicating with utility meters is disclosed in U.S. Pat. No. 5,189,694, entitled "Telemetry Access Arrangement", which issued on Feb. 23, 1993 to Garland, the disclosure of which is hereby incorporated by reference. Suppressed ringing communications are communications that are initially set up without ringing the user's telephone and are not affected by preset switch activated, or user selected, features impacting communication in either direction. After being initially set up, only data messages are sent or received by the service provider. After completion of the suppressed ringing call, the preset line features are returned their original end user set up state. Configuration parameters and features may not be modified during the call.

Referring to FIG. 1A, a prior communication system 10 has a server 12, such as a personal computer or workstation, connected through either a trunk 14, preferably a digital T1 trunk, to a central office switch (CO) 16. The CO 16 includes a protocol interface 18, preferably software-based, associated with a switch unit 20, such as a multiport telephonic CO switch. An exemplary CO switch is described in U.S. Pat. No. 5,509,054, entitled "Communication Switching System" and which issued on Apr. 16, 1996 to Garland, the disclosure of which is hereby incorporated herein by reference. The CO 16 is interfaced to the CPE 22, via a regular, twisted-pair, plain-old-telephone service (POTS) line 24 and a suitable modem (not shown). Alternative transmission media may be employed, such as coax or fiber or digital communication services to the CPE.

In accordance with known protocol for establishing suppressed ringing data communications, the server 12 goes off-hook and transmits a wink start and some information. The information typically transmitted includes a key pulse signal (KP), CPE Transmission Indicator (CTI) information, billing number identification (ANI) information, a start signal (ST) and a four, five seven or ten digit directory number. The CTI is used by the CO 16 to identify the type and kind of devices that comprise the CPE 22. The ANI indicates the telephone billing number of the trunk 14. The KP signal indicates the start of a data string and the ST indicates the end of a data string. The switch unit 20 responds to this information by creating a communications link or path to the CPE 22 without ringing the line 24 or being affected by the features associated with the line 24.

The switch unit 20 translates the received directory number to identify the CPE 22 and sets up a connection between the trunk 14 and the line 24. The connection is made with suppressed ringing functionality. The server 12 transmits an alert signal to the CPE 22 requesting that data communications be established. In response, the CPE 22 sends an off-hook signal to the switch unit 20 and the switch unit 20 so notifies the server 12. All of this communication is merely to set up the communication path between the server 12 and CPE 22. A similar method may be used to alert the CPE to become active without requiring the CPE 22 to return an off-hook signal to the switch unit 20, commonly known as on-hook data transmission.

During the course of the single communication link, there is no flexibility or capability for features of the service to be modified, as discussed in previously cited U.S. Pat. No. 5,189,694. In U.S. Pat. No. 5,509,054, entitled "Communication Switching System" to Garland, the disclosure of which is hereby incorporated by reference, a telemetry function indicator (TFI) is disclosed which indicates control information to the switch. In that system, the CTI information indicated whether the CPE was using on-hook or off-hook data transmission. TFI provides a vehicle for the server 12 to tell the switch unit 20 to connect to, for example, a busy line on a barge-in basis. The server 12 may thus require that the switch unit 20 alert the CPE 22 regardless of whether the line 24 is on-hook or off-hook.

The switch unit 20 receives information that a particular feature, or function, is to be performed and is given information (auxiliary data) to be used to perform the particular function, such as a 'load broadcast list' function. For a load broadcast list function, the switch unit 20 is preloaded with a list of telephone numbers on a broadcast list to call in response to receipt of the broadcast function. In this manner, the server 12 is able to connect to CPE associated with a plurality of different end users by having the switch unit 20 automatically setup a plurality of suppressed ringing communication paths.

In addition, the server 12 disclosed in U.S. Pat. No. 5,509,054 could request that the switch unit 20 perform some functions. This could only be performed on a per call basis because multiple cells could not be handled in a single call setup. In these prior systems, call features, provided by the network switch, cannot be dynamically modified during a cell because the functional paths are predefined and are followed without variation. Once a call is set up, there can be no change to the switch operation effected by the server 12 or the CPE 22.

Accordingly, there is a need for a system and method for establishing suppressed ringing communications between a server and a CPE wherein the call features, provided by the switch, may be modified during the duration of the call.

SUMMARY OF THE INVENTION

A system and method in accordance with the present invention overcomes the aforedescribed limitations of prior systems wherein a remote customer station or server provides control signals to the switch to control selected functions after call setup and during the course of data communications and receives from the switch an indication of changes in status of the switch which occur in response to the control signals.

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. Since the following is for summary purposes only, none of the aspects present below should be considered essential to the present invention, which is solely defined by the appended claims.

In accordance with one aspect of the present invention, a method for establishing a call between a customer station and a telephone switch in a suppressed ringing protocol environment is provided. The method comprising the step of transmitting control messages from the customer station to the telephone switch during data communications of the call to control one or more functional capabilities of the telephone switch. The method may further comprise the step of transmitting status messages from the telephone switch to the customer station which are indicative of a status of the one or more functional capabilities of the telephone switch.

The control messages may be analog signals, or digital signals or any combination thereof. Additionally, the customer station may be a server, customer premises equipment or an end user. In order to provide a two level end user database permissions, the method may further comprise the steps of: providing a first code from the end user permitting the end user to control one or more of the functional capabilities; and providing a second code from the end user permitting the end user to provide data communications. The method may also comprise the step of generating a billing record relating to the communications. The billing record may be based on each of the control messages, each of the status messages, or any combination of both received by the telephone switch during the communications.

In accordance with another aspect of the present invention, a method for establishing a call connection between a customer station and a telephone switch comprises the steps of: accessing the telephone switch from the customer station to provide control messages to the telephone switch for controlling functional capabilities of the telephone switch and to receive status information from the telephone switch; establishing in a single call session initiated by the customer station, multiple operations of providing control messages, receiving status information and transmitting data messages; and creating a billing record for each transmission of the data messages within the single call session.

In accordance with yet another aspect of the present invention, a method is provided for establishing communications between customer premises equipment and a server through a switch unit having a protocol interface comprising the steps of: establishing a communication link between the server and the protocol interface; passing control messages from the server to the protocol interface to selectively modify functional capabilities of the switch unit associated with communications between the server and the customer premises equipment; and passing status messages representative of modifications in status of the switch unit resulting from the control messages from the switch unit and through the protocol interface to the server.

In accordance with a further aspect of the present invention, a method for establishing a call between a customer station and a sever through a telephone switch in a suppressed ringing protocol environment is provided. The method may comprise the steps of: transmitting control messages from the telephone switch to the customer station during a data communications of the call to control one or more functional capabilities of the customer station; and transmitting status messages from the customer station to the telephone switch which are indicative of a status of the one or more functional capabilities of the customer station.

The step of transmitting control messages may further comprise the step of: transmitting control messages from the telephone switch to the server during the data communications of the call to control one or more functional capabilities of the server; and transmitting status messages from the server to the telephone switch which are indicative of a status of the one or more functional capabilities of the server.

In accordance with another aspect of the present invention, a system is provided for establishing communications. A telephone switch has functional capabilities for establishing suppressed ringing communications and for generating status messages representative of status of the functional capabilities. A customer station requests that the telephone switch establish suppressed ringing communications and generates control messages for modifying the functional capabilities of the telephone switch. The telephone switch transmits the status messages to the customer station in response to the control messages to indicate modifications in the functional capabilities.

The telephone switch may comprise a software features program for modifying software capabilities of the telephone switch based on the control messages. The telephone switch may comprise a hardware control for modifying a hardware configuration of the telephone switch based on the control messages.

These and other features and advantages of the present invention will become apparent from the following detailed description, the accompanying drawings and the appended claims.

BRIEF DESCRIPTION OF THE DRAWINGS

The advantages of the invention are disclosed in the drawings of the known communication system and the detailed description of embodiments of the invention illustrated by reference to the several figures of the drawings in which.

DETAILED DESCRIPTION

Figure 1A:
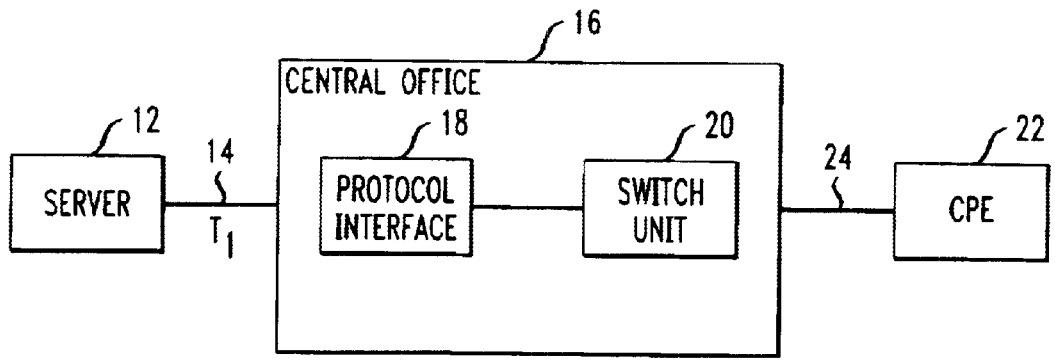
FIG. 1A is a simplified illustration of the known communication system described above in the background portion of this disclosure.

What is described in this application is an architecture, method, and procedure whereby a communication device, such as a server, can communicate with a telephone switch and control the telephone switch operation to cause changes in the predefined network and/or office engineered variables at any time during the call. The present invention allows any remote customer, or customer station, having access to the telephone switch, to provide control information to the telephone switch and receive status information from the telephone switch. For purposes of this disclosure, the remote customer, or the remote customer station, may be a server, CPE, or end user. Capability is provided for multiple control/status and data messages during a single session with the telephone switch. Capability is also provided to allow the telephone switch to bill on a per message basis during a single session between the remote customer station (server, CPE, or end user) and the telephone switch.

Servers need to efficiently and non-restrictively access CPE connected to the switched telephone network. Today, the CPE is predominantly connected to analog lines. The least expensive method of accessing the CPE is by utilizing a non-dedicated telephone line (sharing the line with the end user). End users, however, do not want to be alerted when data calls to their CPE are received. Additionally, end users, during the normal use of their telephone, may activate features on their telephone line that would prevent access by the server (i.e. call forwarding). In the CPE to server direction, end users may invoke features that may be changed if a CPE device initiates a call (i.e. call blocking).

Higher speed data communications allows for a greater number of applications providers located at a greater distance from the hosting local telephone company. Such distance requires a more robust communications capability depending on the applications that are communicating over the data communications path. Additionally, the same server may provide different data communications applications at different times requiring different capabilities for different applications. As more applications are devised, or as needs change, the predefined network and office engineered variables in the telephone switch may need to be modified before a call is placed or during the call duration.

An information exchange is required between the telephone switch and remote customer stations (servers, CPE, and end users), which allows for control/status messages to be sent and received. When a control message is given to the telephone switch, there is a need to have the telephone switch determine if the request is legitimate and, if so, perform the function and respond to the requester with a status. There is also a need to establish a typical data call through the telephone switch. Therefore, there is a need to provide for bi-directional multiple messages per suppressed ringing origination. Billing for these multiple messages activated by the telephone switch is also required.

Existing Intelligent Pathway (also known as Suppressed Ringing) protocol includes a basic and enhanced capability for many applications in which the telephone switch acts as a transparent transport without being affected by the subscribed to line features or the data of the call. The basic platform supports non-ringing access by the server to the end user's line regardless of the state of the assigned features. This basic platform makes use of the existing switch fabric which gives this feature the same call set-up efficiencies as a normal telephone call. In the CPE to server direction, there are features that the end user has activated that may prevent the CPE from calling back through the switched network to the server. The suppressed ringing platform allows these calls to be completed by temporarily suspending the customer designated features.

Communication connections from a server to a central office telephone switch may be connected via dedicated communications links. Dedicated links are used to identify the call type based on trunk group. The central office switch further connects these calls to the CPE using the suppressed ringing feature. It should be noted that the ability to send and receive call control and status messages is independent of the call set-up method, e.g. suppressed ringing. Operationally in the outbound direction, the server goes off hook to the telephone switch which, through the suppressed ringing software, automatically activates, deactivates, or ignores certain telephone switch-based communications capabilities. In response to the server going off hook, the telephone switch establishes a suppressed ringing connection with the end user's line, thus providing for bi-directional communications between the server and the CPE. When data communications have been complete, the telephone switch, and thereby the server, is disconnected from the end user's line and the telephone switched-based features are "restored" to the line. This outbound switched connectivity has already been developed and is known as suppressed ringing as described in U.S. Pat. No. 5,509,054 and the IEEE Standard 1390, the disclosures of which are incorporated by reference.

In the inbound direction, the CPE initiates a call through the telephone switch to the server. After receiving an appropriate access code from the CPE, the telephone switch automatically activates, deactivates, and/or ignores certain switch-based communications capabilities. The telephone switch then initiates a connection with the server allowing for bi-directional communications between the CPE and the server.

There are many applications which will take advantage of a suppressed ringing end user access with call control and status capability. A specific example of a server initiated application is downloading computer files containing end user selected documents, content provider documents (push techniques), meter reading, or e-mail to a PC when the computer is not in use. New computer programs could also be downloaded. Smart appliances may be called to initiate internal maintenance routines. An additional capability added to the suppressed ringing trunk protocol and switch software allows any remote customer station (server, CPE, or end user), to control (communicate with) the telephone switch to affect changes in the telephone switch and have the telephone switch respond with status messages.

Using an enhanced protocol, one or more TFI values are defined that will identify the transmission of a control/status message which is to be used by the telephone switch to manipulate telephone switch elements and not as parameters to complete a call. Control of telephone switch components and elements would enable changing of telephone switch variables, capabilities and limitations and also permit invoking software routines and changing hardware elements via software. For example, a suppressed ringing trunk has variables which control the duration of an abbreviated ring signal or the duration of the call. Based on field experience, per call requirements, or service parameters the server, CPE, or end user may want to change some or all of these variables. In particular, the duration of the abbreviated ring signal or the maximum suppressed ringing call time may require changes for specific communications applications.

As another example, previously installed remote subscriber loop carrier (SLC) channel units may need different abbreviated ring times not presently assigned to an existing trunk group. As an additional example, the duration of a call may need to be increased if a server wants to download data content and receive confirmation of the download or a CPE device has a very long data stream to transmit. This new capability gives the server, CPE or user the capability of changing switch elements that normally could only be changed by trained communications personnel, commonly termed "craft", who have direct access to the switch via an Operations, Administration, Maintenance and Provisioning (OAM&P) channel. The descriptions that follows provides examples of only a few of the many applications that can be accommodated and the many telephone switch components and elements that may be modified in accordance with the present invention.

Network Architecture

Figure 1B:
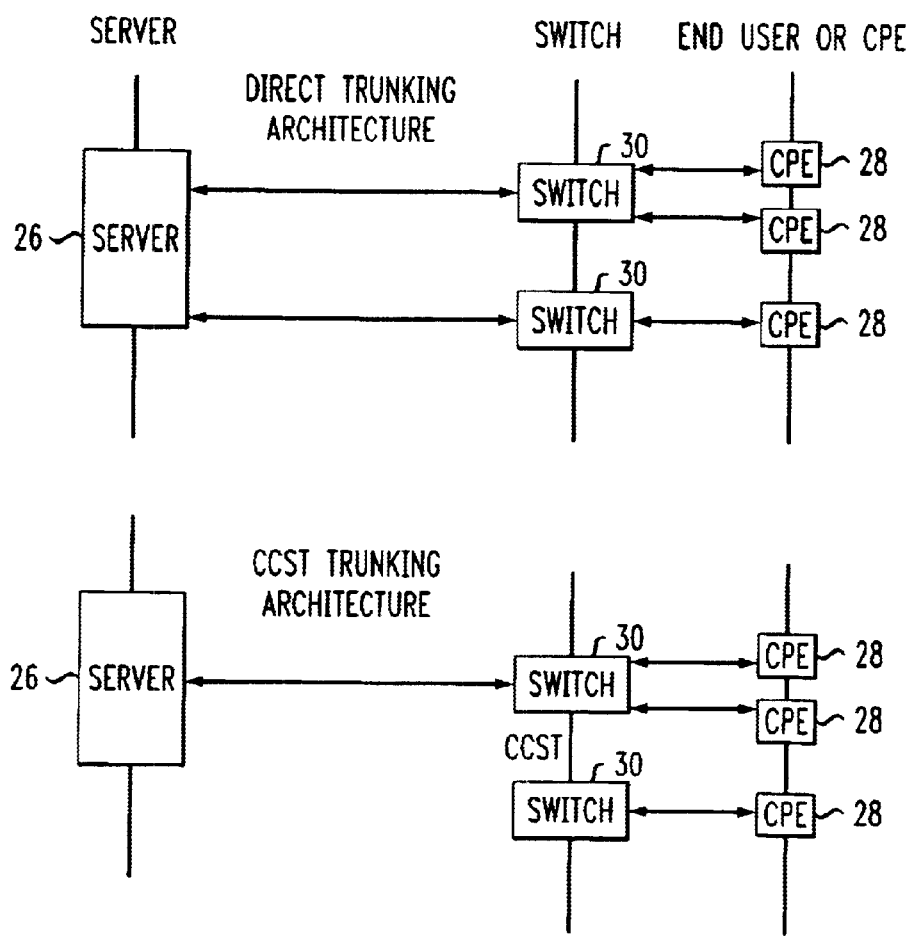
FIG. 1B is a block diagram of two embodiments of the Intelligent Pathway Architecture, a direct trunking and a common control switching trunk #7 (CCS7) trunking architecture.

A direct trunking architecture and a CCS7 trunking architecture is shown in FIG. 1B. These are two embodiments of a known Intelligent Pathway™ architecture. Data communications protocols describe data flow between a server 26 and a CPE 28 through a switch 30. This data flow is transparent to the telephone network and passes through the network without effecting the telephone network. For purposes of this description, and not as a limitation, the telephone network will refer to the telephone switch. This call capability is more fully described in the U.S. patents previously incorporated by reference.

With the addition of network control, information transmitted between the server 26, the telephone switch 30 and the CPE 28 contains control/status messages intended to affect the operation of the telephone switch 30. Both the Intelligent Pathway data flow between the server 26 and the CPE 28 as well as the control/status message flow between the server, CPE and/or telephone switch can coexist over the same data communications link. The data flow and control/status message flow are uniquely represented in the data communications signaling. The data message is CPE related and the control/status message is telephone switch related.

Figure 1C:
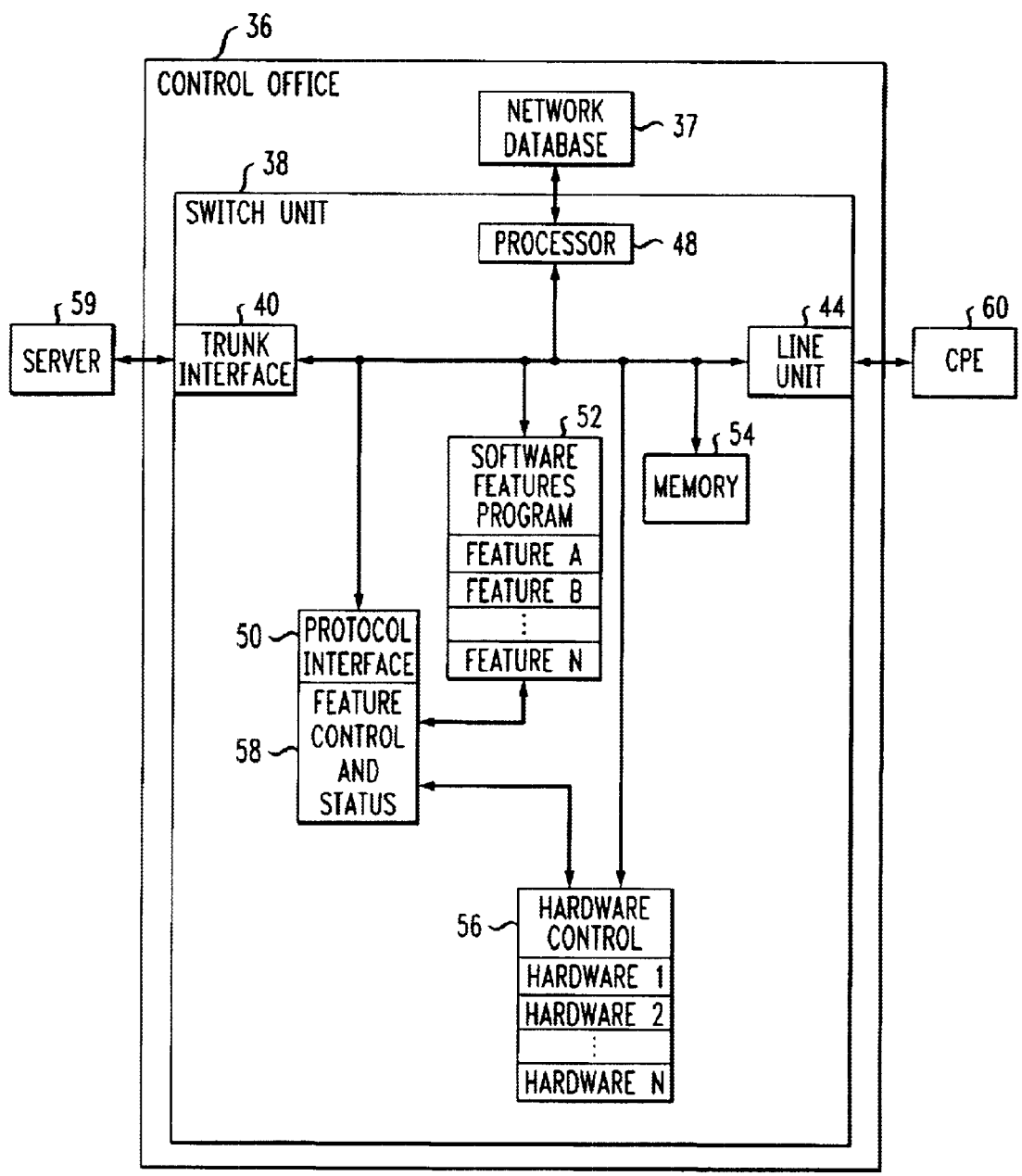
FIG. 1C is a functional block diagram of a system in accordance with the invention.

A functional block diagram of the status and control system accordance with the present invention is shown in FIG. 1C. A central office 36 includes a network database 37 and a switch unit 38 comprising a trunk interface 40 and a line unit 44. The trunk interface 40 and the line unit 44 are connected to a processor 48, a protocol interface 50, a software features program 52, a memory 54 and a hardware control 56. A feature control and status program 58 associated with the protocol interface 52 controls the software features program 52. The hardware control 56 provides a hardware change out control as interfaced by the feature control and status program 50. The trunk interface 40 is connected to the line unit 44. The trunk interface 40 provides communication with a server 59. A CPE 60 is connected to the line unit 44 of the switch unit 38.

In operation, a message received from the server 59 by the protocol interface 50 instructs a change of one or more of features A–N in the software features program 52 and of one or more of hardware capabilities 1–N. The server 59 also requests that a status report be provided by the protocol interface 50. Conversely, the same procedure may be followed in the reverse direction by the CPE 60 sending such messages to the switch unit 38. The control of one or more of the features A–N and/or the hardware 1–N with a corresponding status report is achieved as accomplished for the server 59.

Additional Intelligent Pathway Platform
Capabilities Using Control/Status Messaging The following capabilities are described in this disclosure:
Control/Status messages to/from the telephone switch and its remote customers (server, CPE, or end user);

Intermixing of Control/Status messages with data messages;

Multiple bi-directional messages per call origination;

Call originations applicable to voice, data, and control/status messages;

Billing capability on a per message basis within the same call origination (control, status, or data) (i.e., multiple billing records based on service requests);

Queuing of data messages in the switch, when the suppressed ringing trunk is in use;

Use of hunt groups or automatic call director usage;

Double level end user database permissions;

CPE parameters in switch or network database; and

Change to another suppressed ringing trunk during a message;

The call flow described in this disclosure is expressed in terms of off-hook, on-hook, wink and other signals. In actual practice, the protocol will be implemented by the most efficient method, depending on the data communications capabilities available. The signals described here are illustrative of a number of different specific implementations. For example, these signals could be implemented in analog signaling, ISDN (Q931) signaling, and other digital representations, such as the H.323 protocol suite.

Although all CPE communications today are accomplished by off-hook data transmission, the Intelligent Pathway service is described with both an on-hook and off-hook data transmission capability. With on-hook data transmission, the telephone switch can supervise the line, sensing the end user off-hook signal, drop the Intelligent Pathway data call, and provide dial tone service to the end user. With off-hook data transmission, the CPE must inform the server to terminate the call, or the server may inform the CPE to terminate the call.

Data messages are defined as messages sent between the server and the CPE. These data messages can either be voice or data communications. In either case, these messages pass through the telephone switch without effecting the telephone switch. Control or status messages are defined as messages between the server or end user/CPE (the customer station) and/or the telephone switch. These control/status messages terminate in the telephone switch and affect the operations of the telephone switch either on a per call basis or until changed. Control/status messages may also originate in the telephone switch terminating and effecting the server, CPE, or end user.

Since control and status messages that effect the telephone switch are not end to end communications, an end user or server revenue bill will not be generated. However, an activity record or service change record may be required. Therefore, a special automatic message accounting (AMA) record will be required for these control/status message calls. Since a control/status message might be billed to one entity and a data message might be billed to another entity, a different AMA record may be required for different control, status, or data messages within the same call origination.

The AMA record will be initiated when digit reception has been completed, prior to the start of Information Transfer. The AMA record will be ended when the switch processes the first of an on-hook or next message condition (Wink (continue), flash, etc.) in the same call origination.

Intelligent Pathway Service-Basic Call Connectivity

Figure 2:
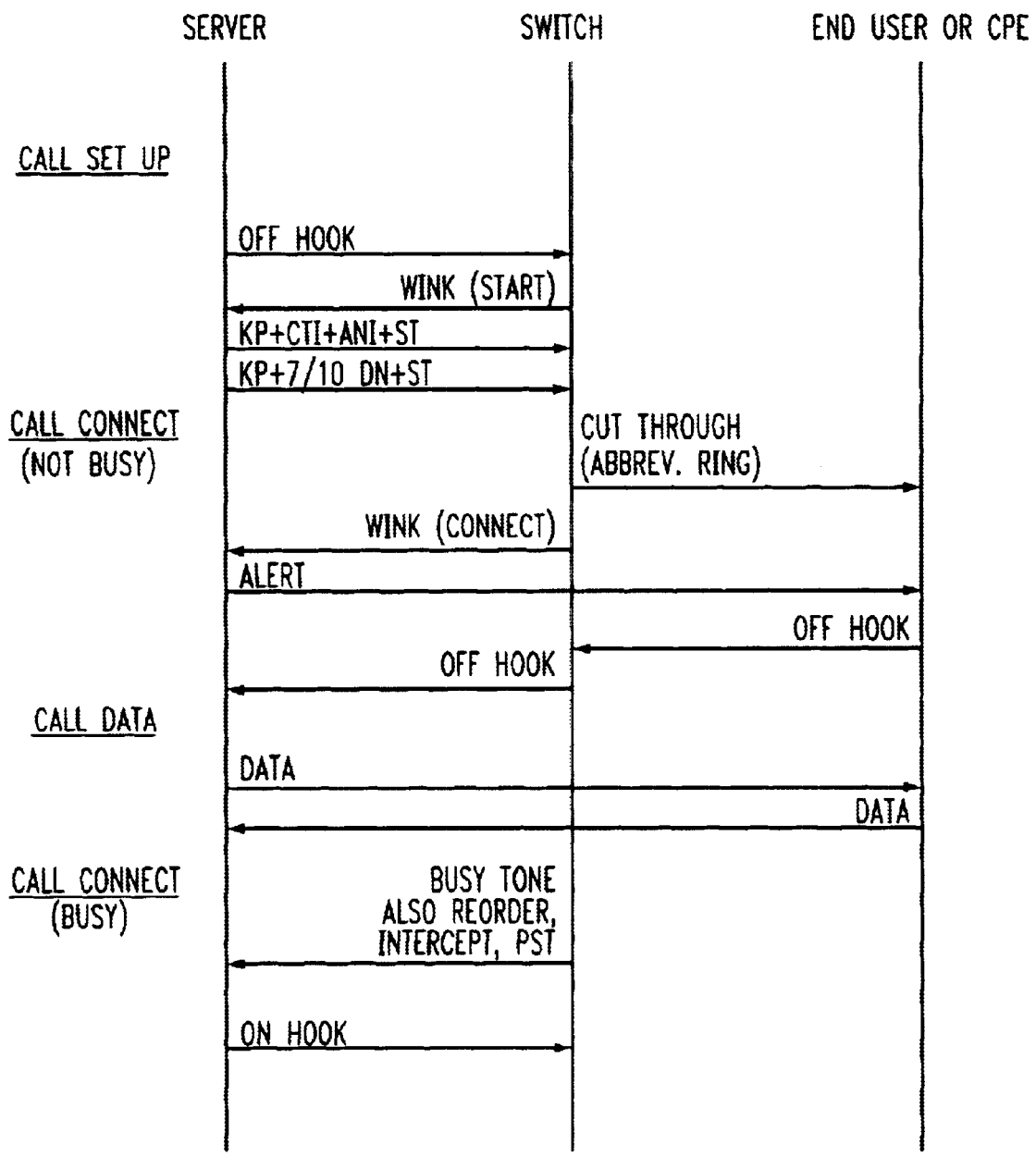
FIGS. 2–4 are signal flow diagrams of the intelligent pathway call initiated by the server (outbound) suppressed ringing, direct connect access method CPE off hook data transmission method described a scenario which covers remote end to end, outbound server initiated (Server→CPE) communications, off hook data transmission, service description.
Figure 3:
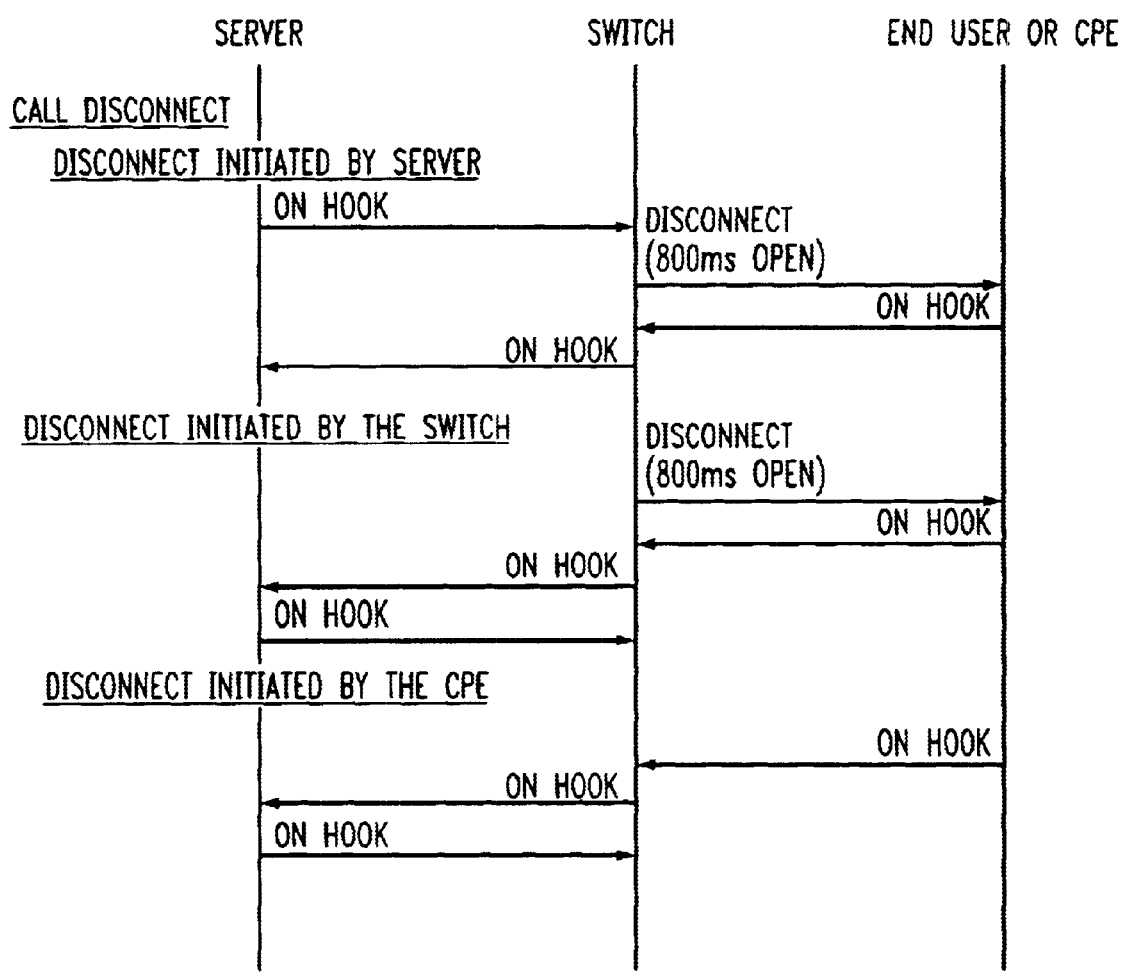
Figure 4:
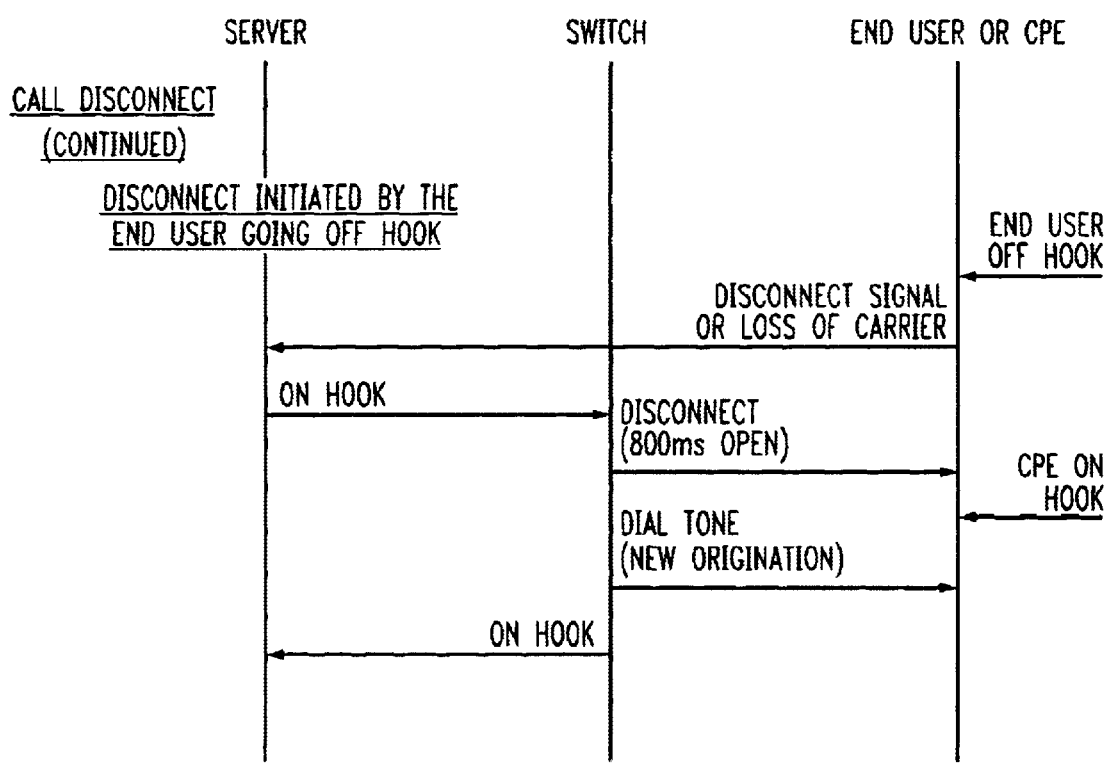
Figure 5:
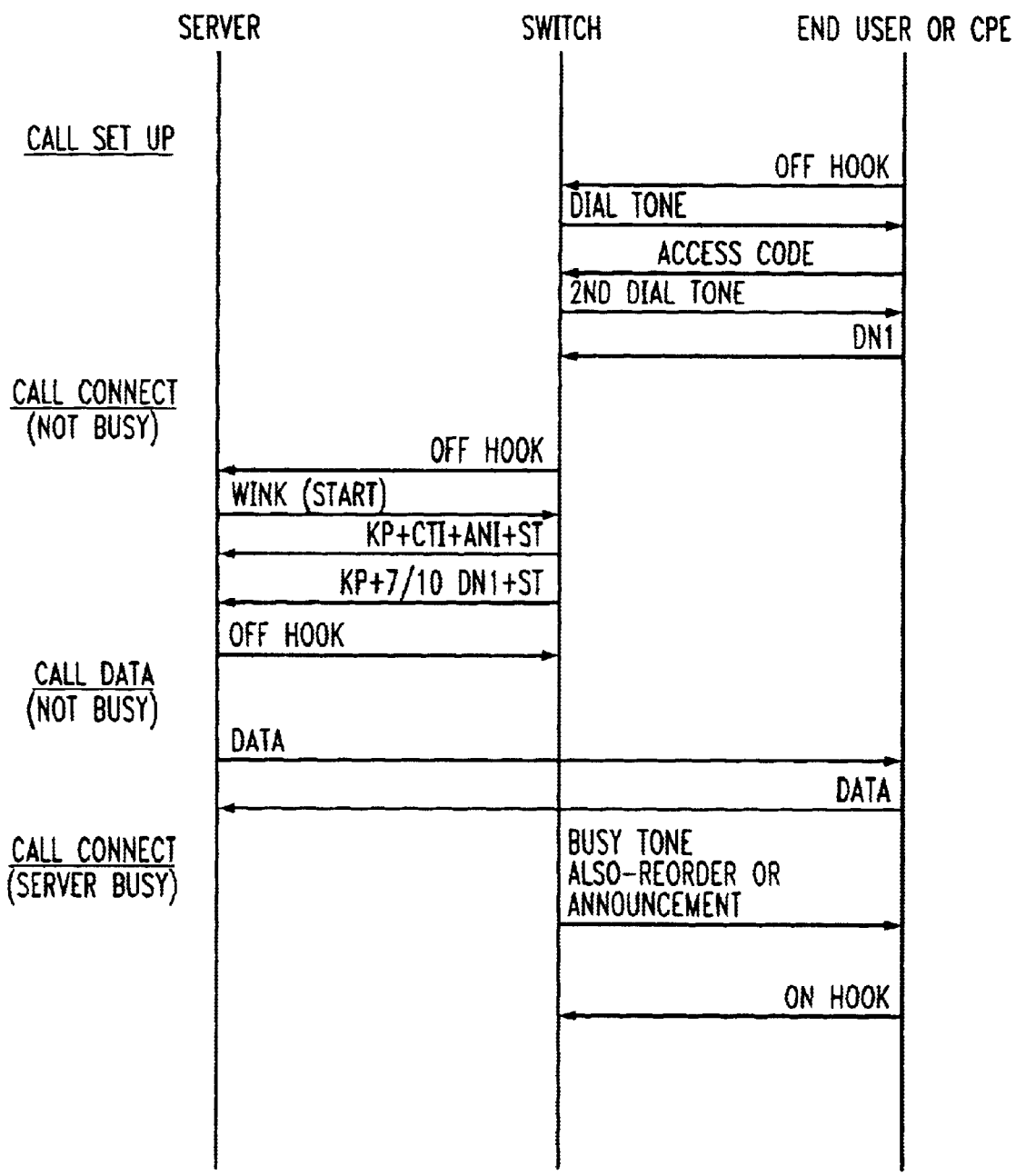
FIGS. 5 and 6 are signal flow diagrams of the intelligent pathway call initiated by the CPE (inbound) suppressed ringing, direct connect access method CPE off hook data transmission method describing the inbound CPE initiated (CPE→Server) communications, call connection.
Figure 6:
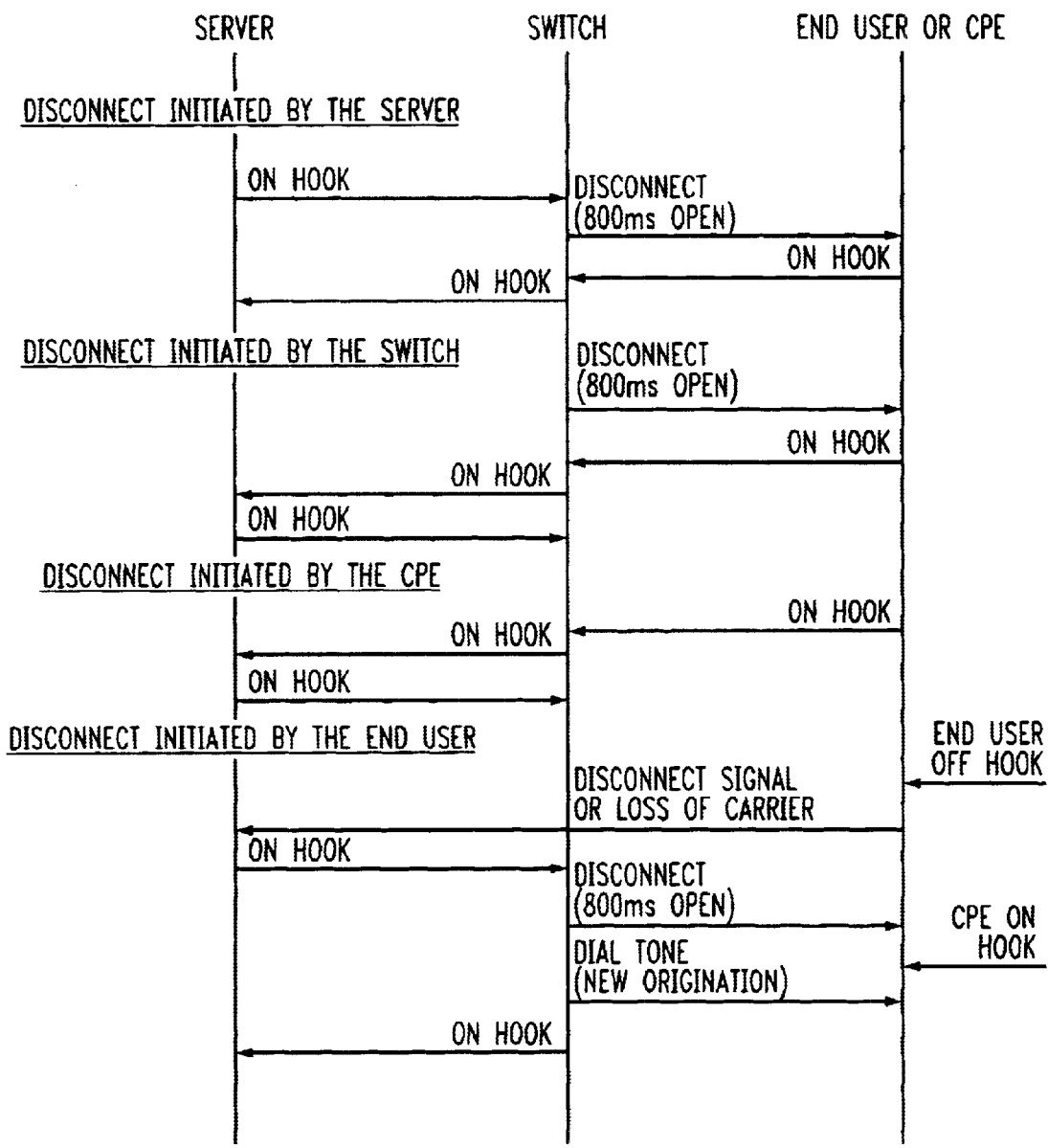
Figure 7:
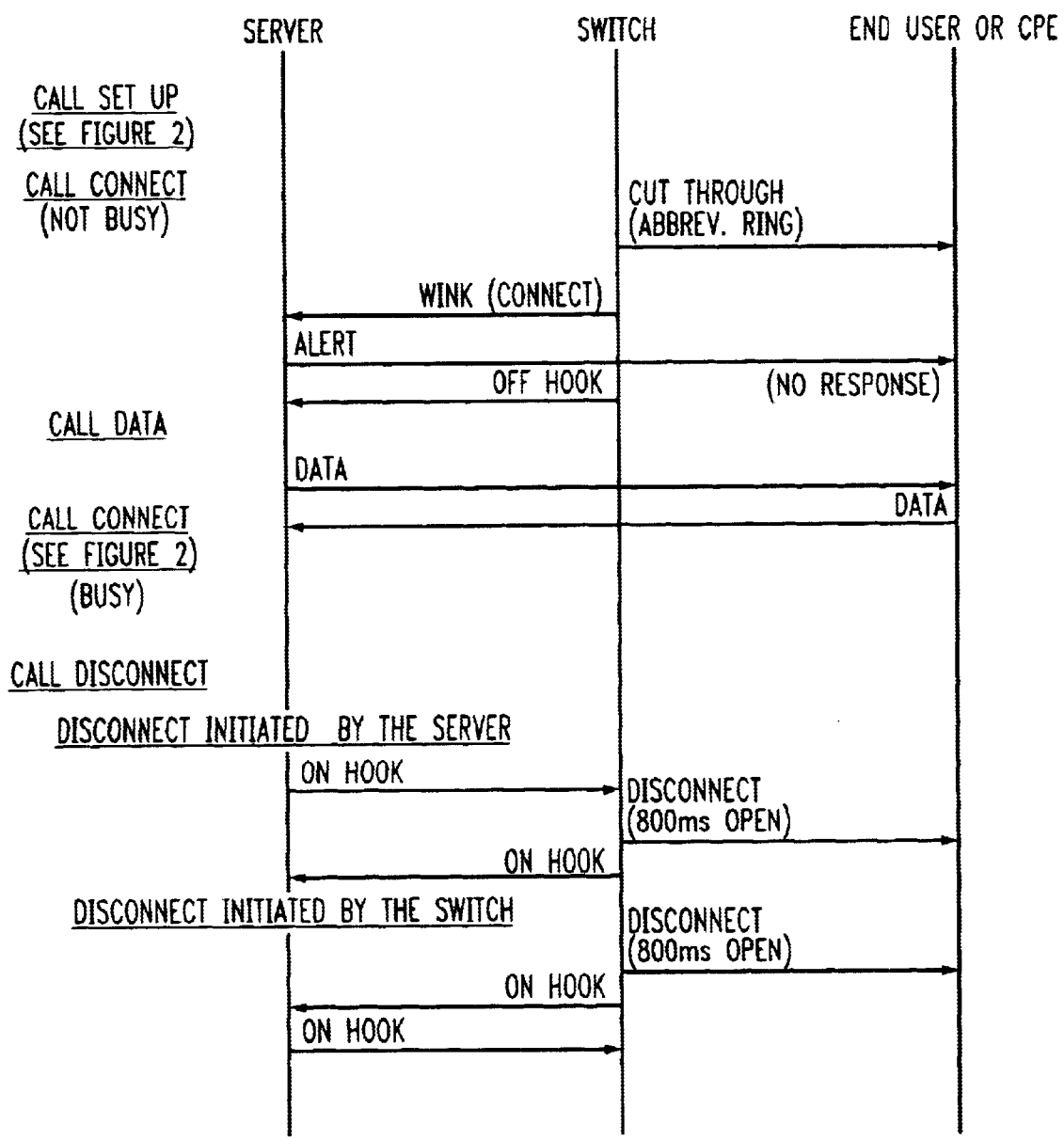
FIGS. 7 and 8 are signal flow diagrams of the intelligent pathway call initiated by the server (outbound) suppressed ringing, direct connection access method CPE on hook data transmission method describing an outbound scenario using on hook data transmission.
Figure 8:
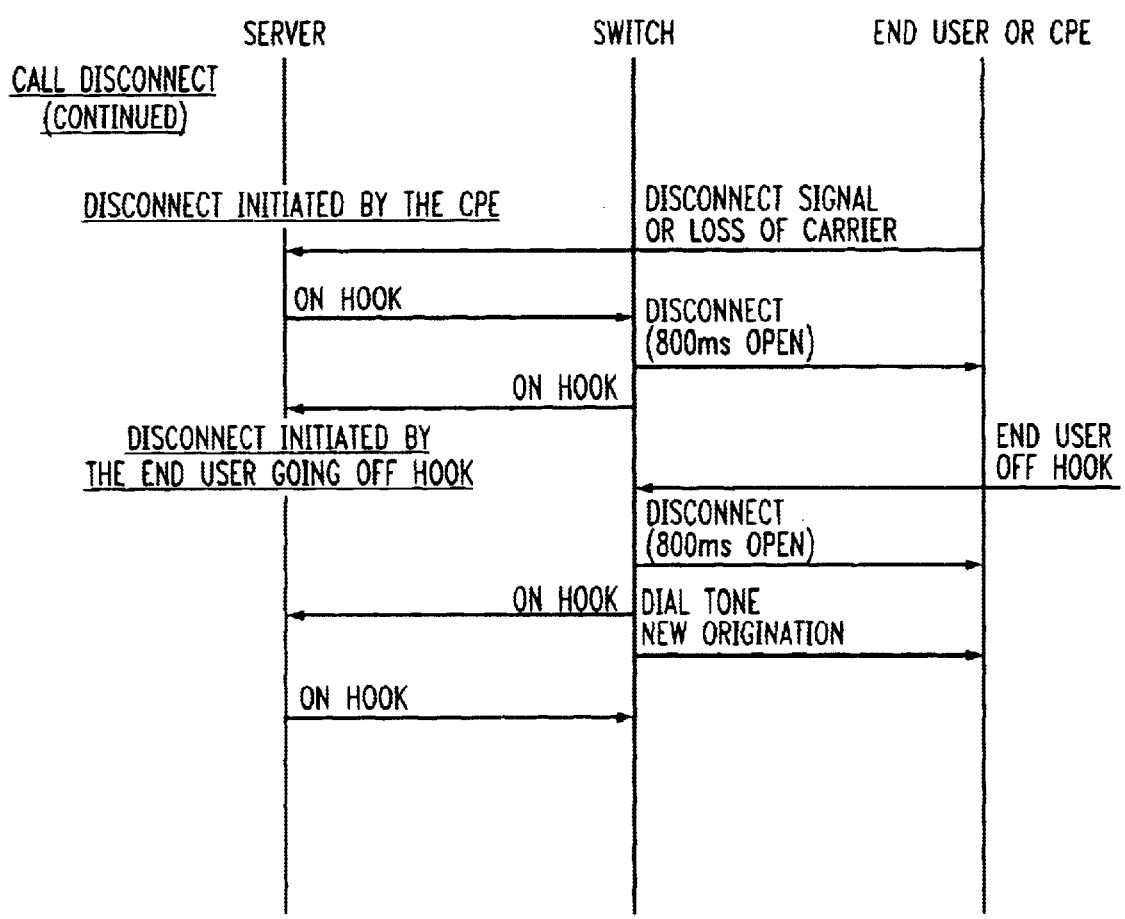

FIGS. 2 to 4 are signal flow diagrams depicting a scenario which covers the complete, end to end, outbound only (server to CPE), off-hook data transmission, service description. FIGS. 5 and 6 are signal flow diagrams depicting inbound (CPE to server) call connectivity. FIGS. 7 and 8 are signal flow diagrams depicting an outbound scenario using on-hook data transmission. The on-hook scenario is further described in U.S. Pat. No. 5,327,488.

The following description defines an off-hook data transmission suppressed ringing capability which, through a suppressed ringing trunk (Intelligent Pathway Trunk), utilizes the standard switch fabric to perform a no-ring access to a residence or business line. This access is a cut through connection and is not affected by features assigned to the line, such as call forwarding or call blocking.

Call Setup

Initiation of call setup will now be described with reference to FIG. 2. The server will go off-hook and seize the suppressed ringing trunk. After a Wink (Start), the server will outpulse CTI digits, ANI, Directory Number, and Ring Duration or Loop Current Feed Open required for the destination CPE.

Call Connect and Data Transfer

End Users Line Not Busy

Referring again to FIG. 2 if the line is not busy, the server is cut through to the end user's line, and, if instructed, a specified Abbreviated Ring duration or Loop Current Feed Open is initiated by the telephone switch to assign a time slot in the concentrated Universal SLC equipment. The end user's phone is not rung. A Wink (Connect) is sent from the switch to the server to indicate that cut through has occurred, the request abbreviated ringing or open interval has been sent on the line, and the server can transmit an alert tone, or FSK alert, to the CPE. When alerted, the CPE will go off-hook, become active and transmit data. After the Wink (Connect), when any CPE goes off-hook, the switch signals off-hook to the server indicating a successful CPE off-hook and to remove the alert tone, or FSK alert. The data transfer state is thus entered between the server and the CPE. This data transfer state is transparent to the switch. If the CPE does not go off-hook to answer the call, the server will disconnect the call.

End User's Line Busy or Not Available

If the end user's Line is Busy or Not Available, the suppressed ringing trunk will signal a Busy, Intercept, Reorder Tone, or Permanent Signal Tone to the server. The server will, depending on the application requirements, bypass this Directory Number until a later time. In response to these signals from the switch, the server will signal an on-hook to the switch.

Call Disconnect

Referring now to FIGS. 3 and 4, the CPE and server should go on-hook and become Inactive upon loss of carrier or signal level. There are four disconnect scenarios:

Disconnect Initiated by the server (normal call)

The server initiates this disconnect by signaling on-hook to the switch. The switch takes down the call and transmits a Disconnect (Open) of approximately 800 ms duration to the CPE as an indicator to go on-hook and become Inactive. The forward disconnect is a signal for all CPE to clear the line. The switch signals on-hook to the server at the beginning of the Disconnect signal to the CPE.

Disconnect Initiated by the Switch

The switch initiates this disconnect by taking down the call and transmitting a Disconnect (Open) of approximately 800 ms duration to the CPE as an indicator to go on-hook and become Inactive. The switch signals on-hook to the server at the beginning of the Disconnect signal. The server responds with an on-hook signal to the switch. The switch may internally tear down the call, requiring recovery conditions to take place in the CPE and the server.

Disconnect Initiated by the End User going Off-Hook

Since the CPE is already off-hook, the switch can not detect the end user going off-hook. Therefore, the CPE is responsible for detecting the end user off-hook, sending a Disconnect (part of the data stream) to the server, going on-hook, and becoming Inactive. The server signals on-hook to the switch and disconnect occurs as described in the server disconnect case. The switch, sensing an off-hook remaining on the line after the 800 ms Disconnect (Open) signal, initiates a new origination and delivers Dial Tone to the end user in a possibly delayed interval.

Disconnect Initiated by the CPE

The CPE goes on-hook and becomes Inactive. The switch senses an on-hook from the end user's line. The switch signals on-hook to the server and takes down the call. The server signals on-hook to the switch.

Intelligent Pathway Service Call Conectivity—
Control, Status and Data

Server Initiated Messages to the Telephone Network

The operation is described in terms of a server placing a call to the telephone switch. Specific call flows are identified for control, status, and data messages.

(a) Call Flow

Figure 9:
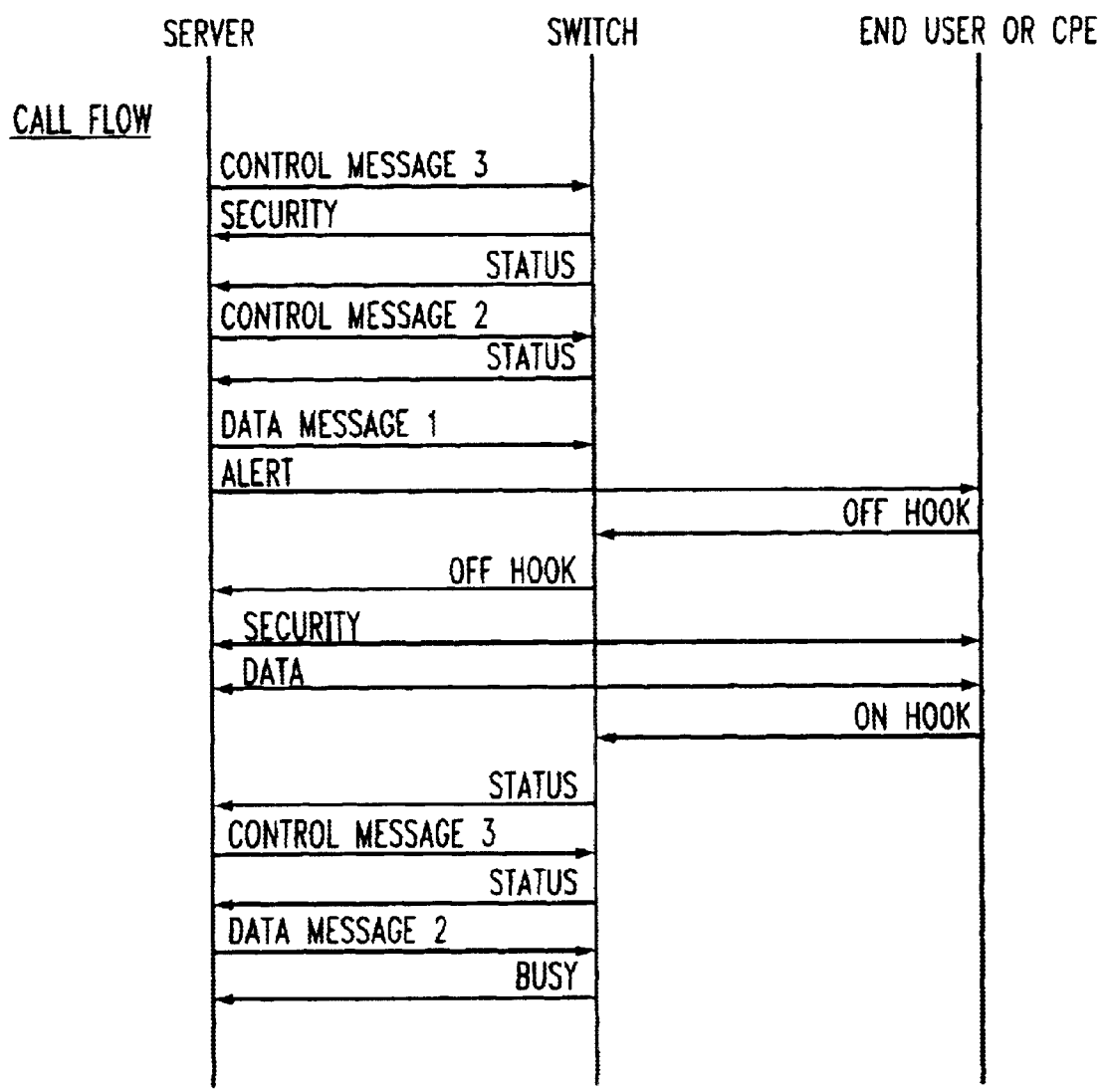
FIG. 9 is a signal flow diagram of call flow of the intelligent pathway control/status/data messages server initiated messages to network (outbound)
Figure 10:
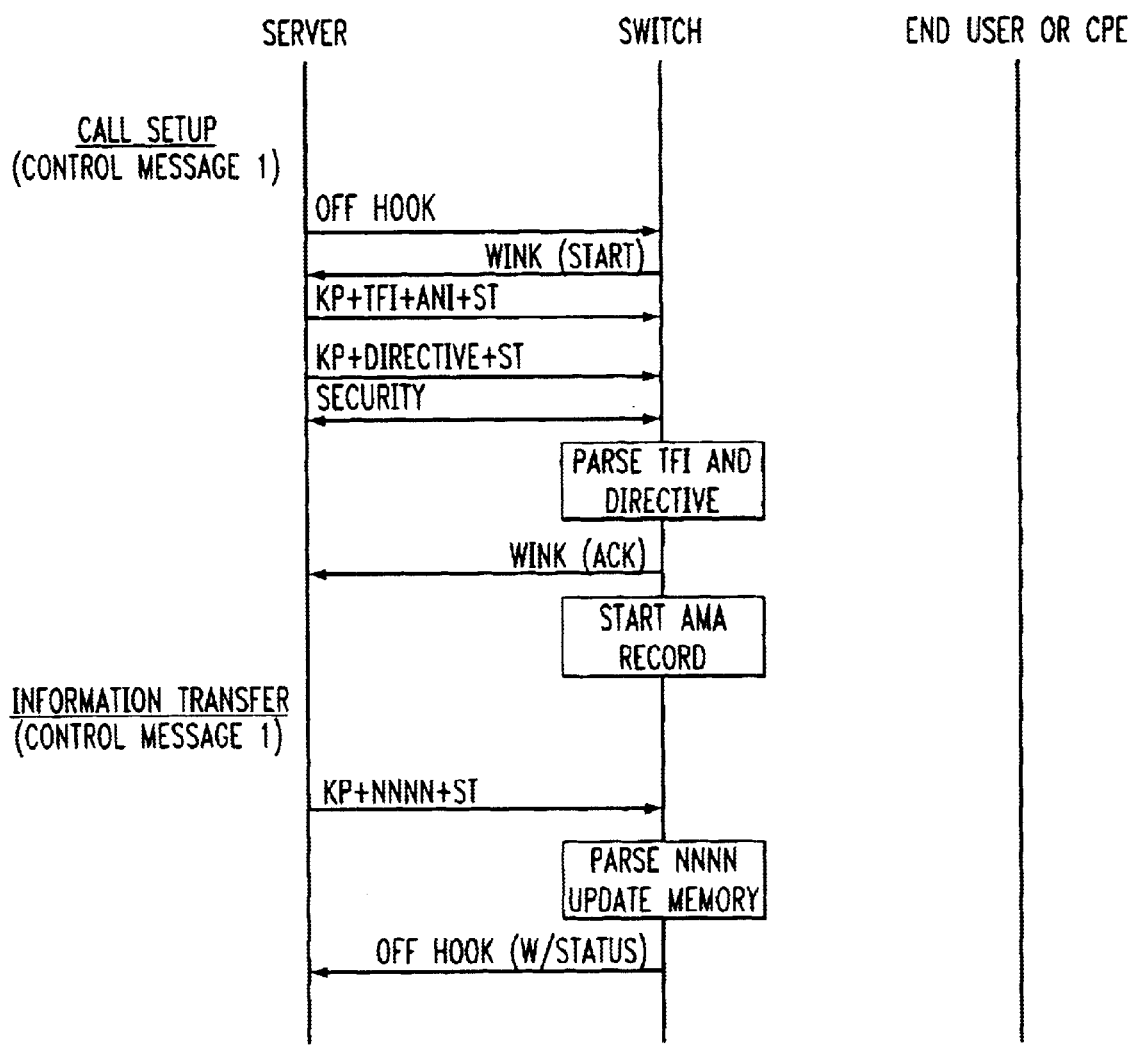
FIGS. 10–14 are signal flow diagrams of call set up, information transfer, and call disconnect of the intelligent pathway control/status/data messages server initiated messages to network (outbound)

Referring to FIG. 9, once the connection to the telephone switch is made, the server sends a control message with parameters, if necessary, to the telephone switch indicating what network element is to be acted upon. A security dialog is necessary to protect the telephone switch against unauthorized changes. A security procedure may include a dial back procedure, personal ID number (PIN), or other security techniques. This security procedure may utilize information stored in the telephone company database for authorization. The control message may be acted upon by the telephone switch immediately or be acted upon at a later time. The server can be directly informed of an error condition within the control message session. The direct feedback would take the form of the telephone switch sending a status message back to the server which indicated success, busy, reorder (temporarily not available), permanent signal tone (not available) or any other status message. If message feedback is required at a later time perhaps due to a delay in accumulating the status information, the telephone switch will, if not already connected, initiate a call back to the server. The initiation of a call from the telephone switch to the server is described in another section.

Multiple control and data messages may be sent to the telephone switch during the same call origination by the presentation of a continue signal. This continue signal is described as a wink or a flash but can be as simple as a bit set in a field for digital applications. It is anticipated that control messages to the telephone switch will require a status or other message from the telephone switch to the server. Multiple control messages to the telephone switch may be interspersed with multiple data messages to the CPE during the same call origination. When a data message is requested by the server, the switch connects the server to the CPE, the server alerts the CPE, and performs a security dialog with the CPE. At the end of the data message, the CPE goes on-hook and the telephone switch gives a status message to the server.

(b) Call Set Up, Information Transfer, and Call Disconnect

Call Set Up

Referring to FIGS. 10 through 14, the server goes off-hook, seizes the Intelligent Pathway Trunk and, after a Wink (Start), outpulses the Intelligent Pathway Trunk protocol. The Intelligent Pathway Trunk protocol communicates to the switch the function identifier (TFI), the telephone number to be billed (ANI), and the function to be performed (Directive). A security dialog takes place. The switch parses the information and acknowledges the successful parsing of the information with a Wink (Ack). At this point, an AMA record is initiated. As a result of the parsing or other processes, Reorder or other call processing tones may be returned to the server in place of the Wink (Ack). In the Busy case, an AMA record is not initiated.

Information Transfer

In response to the Wink (Ack), the server transmits to the switch the parameters of the function to be performed (NNNN). The switch parses the information and updates its memory or database, if necessary. The switch acknowledges a successful parsing with an off-hook signal to the server. The switch may give an error signal (not available etc.) to the server.

Additional Control or Data Messages

Figure 11:
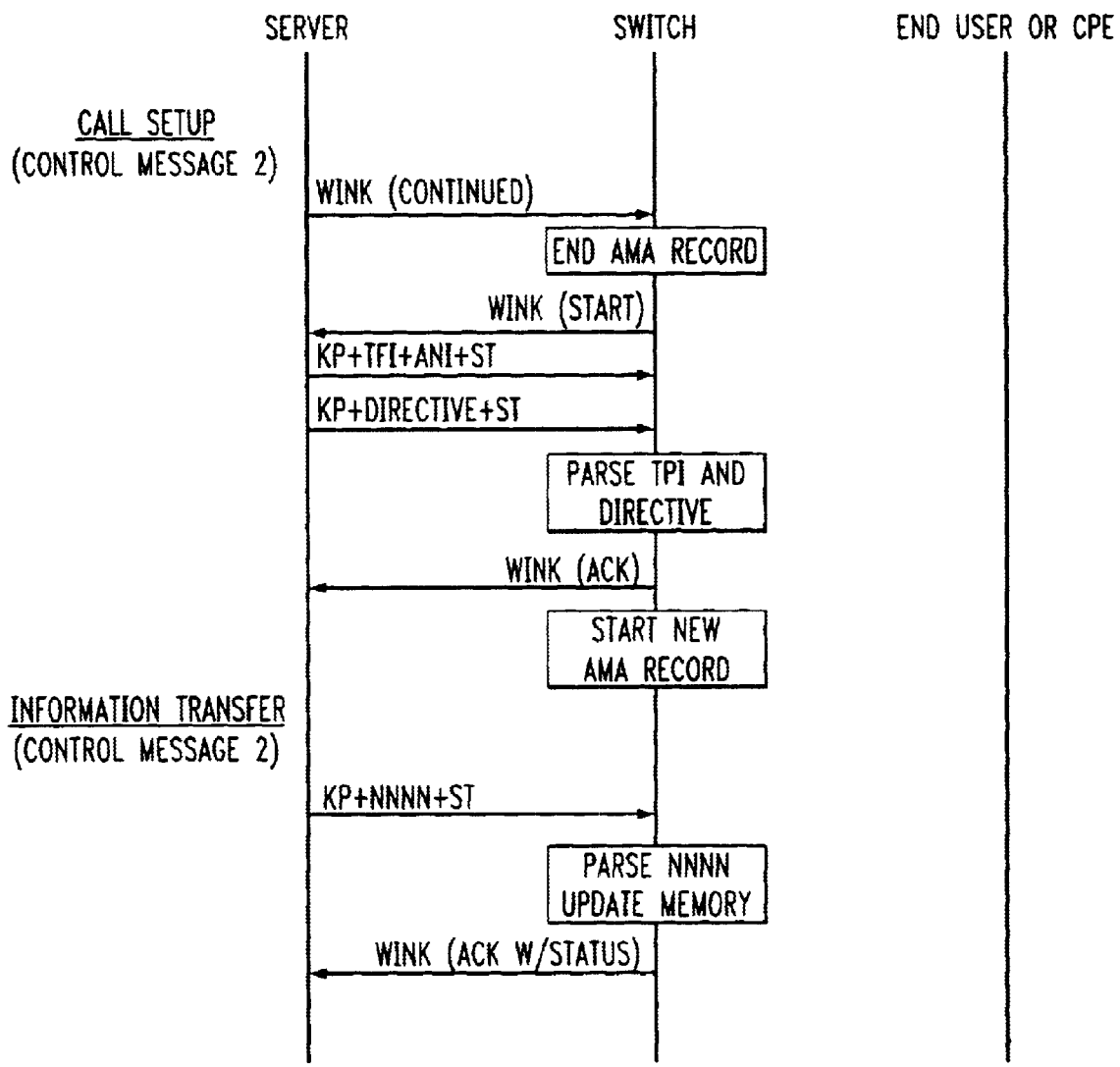

Additional control, status, or data messages may be requested by the server. Each message to the switch contains connect and information transfer information. As shown in FIG. 11, a second control message from the server to the switch is preceded by a Wink (Continue). In response to this Wink, the switch ends the AMA recording for the previous message. The switch gives the server a Wink (start) and receives the Intelligent Pathway Trunk protocol information. After parsing the information, the switch gives the server a Wink (Ack) signal, the switch initiates a new AMA record (for this portion of the call). An information transfer phase is now entered for the second control message. After the control message information transfer and subsequent parsing/updating, a status is returned to the server.

Figure 12:
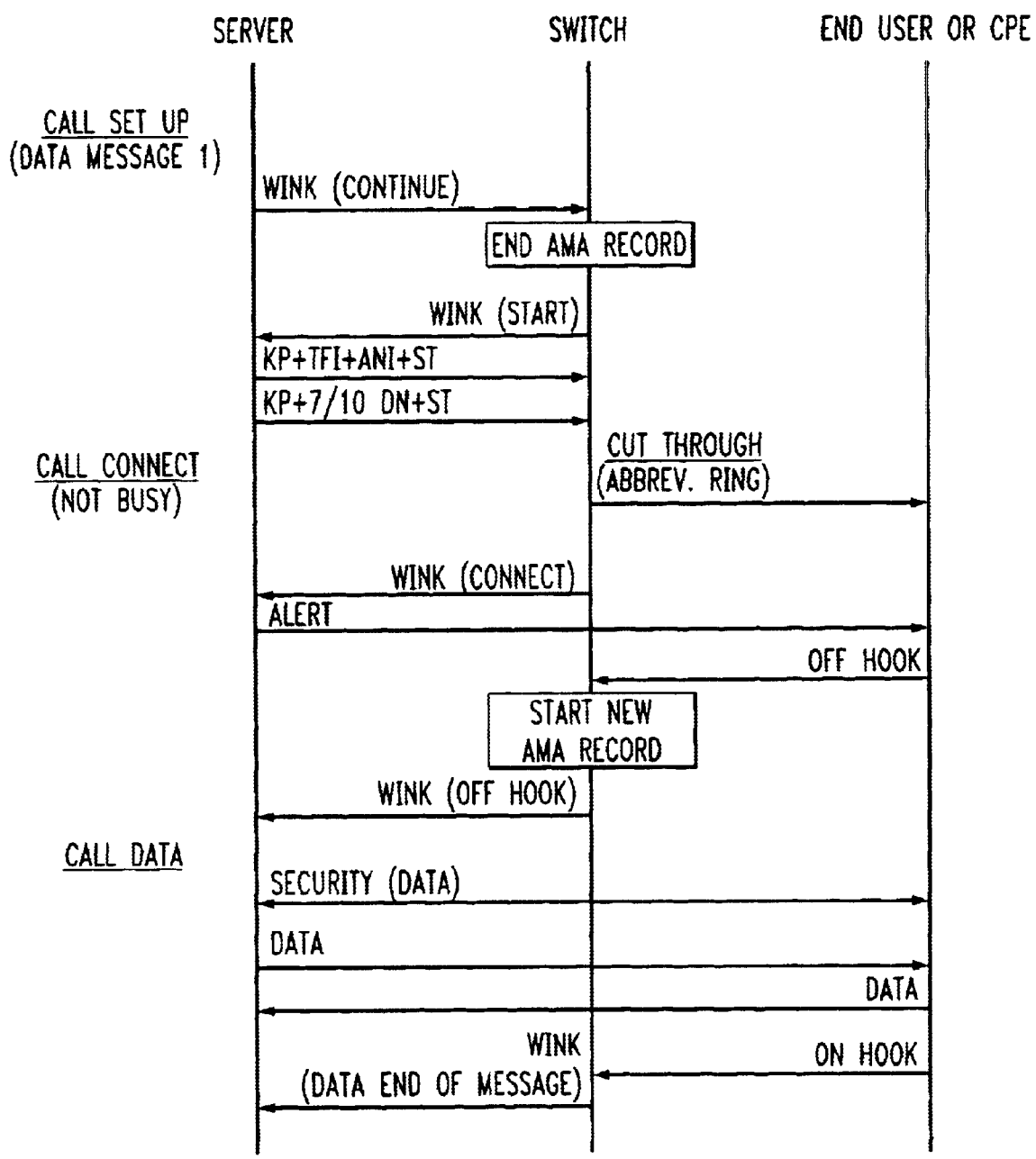
Figure 13:
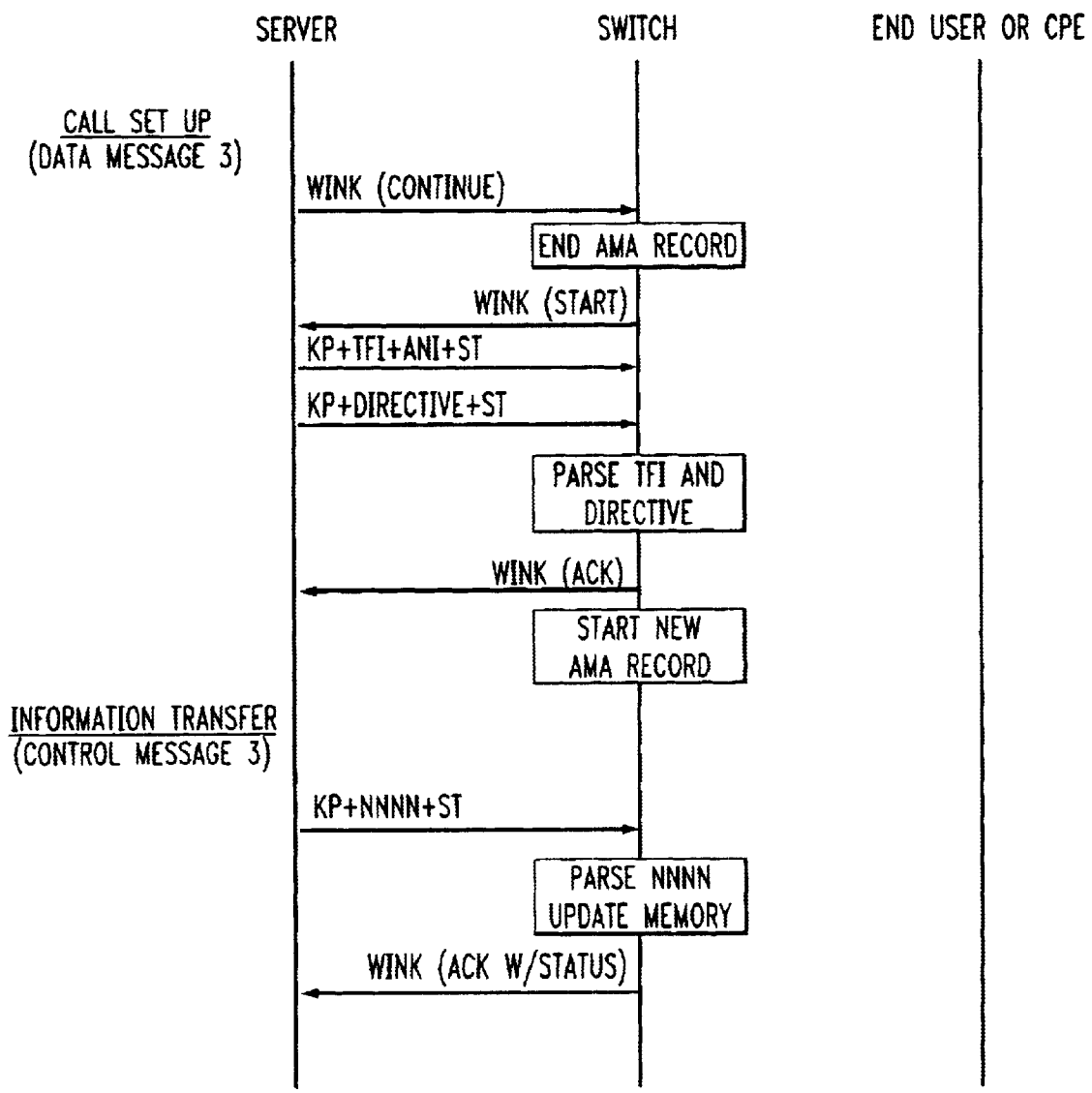
Figure 14:
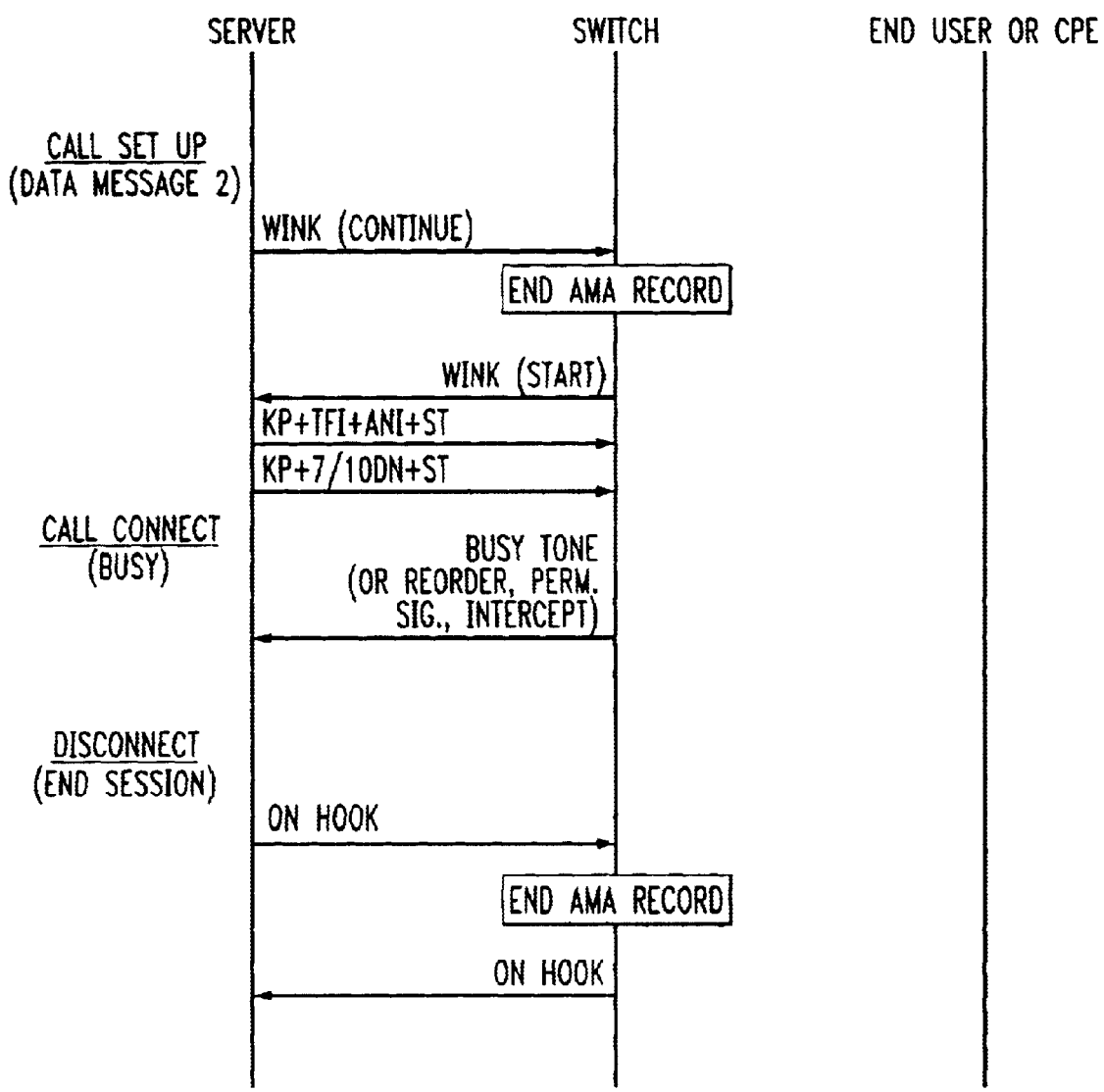

As shown in FIG. 12, in a similar manner, a first data message can be requested by the server. This data message from the server to the switch may be initiated by a Wink (continue) signal. The switch ends the previous AMA record and prepares to accept the next call set up message by sending the server a Wink (Start). The switch receives the Intelligent Pathway Trunk protocol information from the server. Since this is a data message identified by the directory number in the second protocol string and a TFI value for data, the switch cuts through to the designated line, sends abbreviated ringing, if instructed, and gives the server a Wink (Connect) signal. The server alerts the CPE and the CPE goes Off-Hook. The switch signals a Wink (Connect) to the server. If this were only a single message or the first of multiple messages, this second wink would have been an Off-Hook signal to the server. However, the switch has already gone Off-Hook and so a wink is substituted. The switch starts a new AMA record for the new message. Upon receipt of the second Wink (Connect) the server informs the CPE to proceed with data transfer. A security dialog takes place between the server and the CPE. At the end of the data message the CPE goes On-Hook. The switch presents an end of message signal to the server. As shown in FIG. 13, in a similar manner, the server can initiate another control message or data message. As shown in FIG. 14, when a data message is initiated by the server, the line associated with the CPE may be busy or another condition may exist which prohibits the connection to the CPE line. In this case, Busy tone or other tones are returned to the server in place of the Wink (Ack) signal.

(c) Disconnect

As shown in FIG. 14, there are several conditions which will cause a disconnect of the telemetry call.

Disconnect by the Server

At the termination of server messages to the switch, the server signals On-Hook to the switch. The switch goes On-Hook and ends the AMA record generation.

Disconnect by the Switch

The switch may disconnect the call by ending the AMA record generation and signaling On-Hook to the server. The server signals On-Hook to the switch.

Disconnect by the end user going Off-Hook

If an end user goes Off-Hook during a data message or control/status message call to the CPE the normal telemetry disconnect rules apply. That is, the server would initiate a disconnect of the end user's line. There are two options the server could take. The first is to signal a Wink (Continue) to the switch indicating the start of a new data or control message. The switch would disconnect the end user's line and proceed with the next server initiated message to perhaps another CPE location. The second option is for the server to disconnect the call by signaling On-Hook to the switch. The switch would disconnect the end user's line and signal On-Hook to the server.

Disconnect by the CPE going On-Hook

During a data message, the CPE may disconnect the call by going On-Hook. The switch will send an end of Message signal to the server and disconnect the line. The server may continue with another message signal (end of message) or signal On-Hook to the switch.

Network Initiated Messages to the Server

Figure 15:
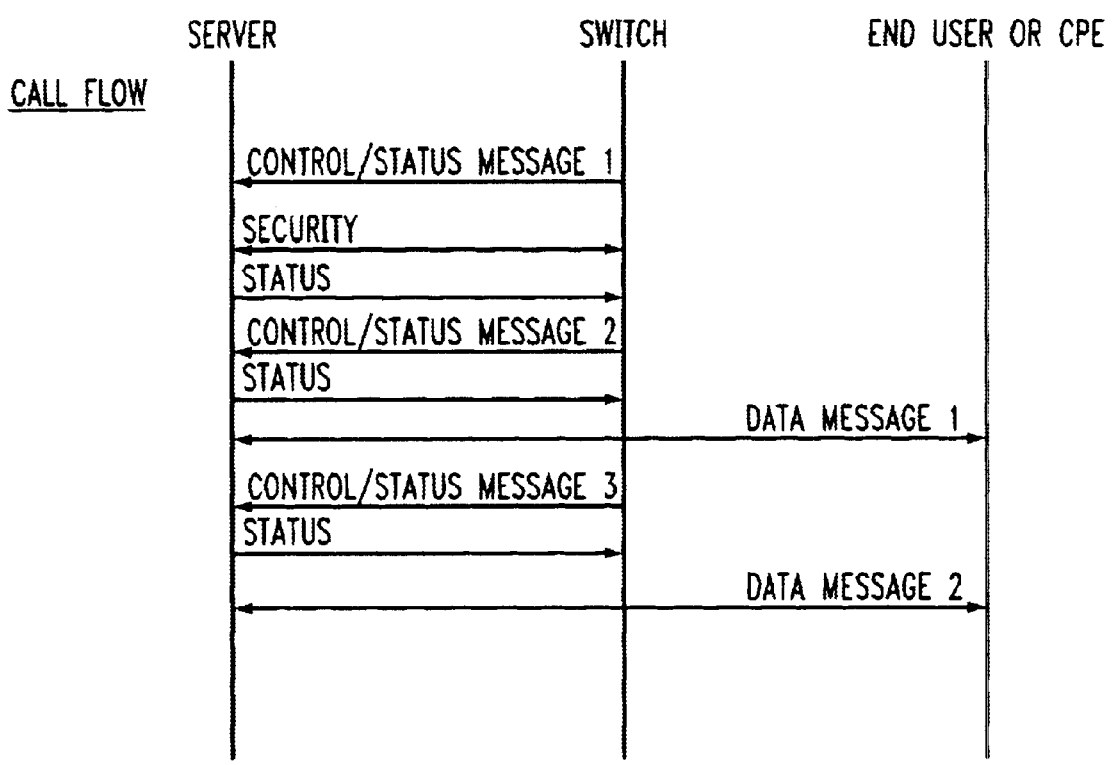
FIG. 15 is a signal flow diagram for network initiated messages to the server of the intelligent pathway control/status/data messages network initiated messages to server.

As shown in FIG. 15, calls may be made to the server for a number of reasons. The telephone switch may want to provide the server with a status report. The telephone switch may have a data message or the telephone switch may want to provide a control message to the server.

Call Flow

Once the connection to the server is completed, the telephone switch sends a control/status message to be acted upon by the server. The control/status message may be acted upon by the server immediately or be acted upon at a later time. The telephone switch can be directly informed of an error condition within the control/status message session. The direct feedback would take the form of the server sending a status message back to the telephone switch which indicated acknowledgment, success, failure, or any other information required. If message feedback is required at a later time, the server will, if not already connected, initiate a call to the switched telephone network.

Multiple control/status and data messages may be sent to the server during the same call origination by the presentation of a continue signal. These multiple messages have previously been described in other sections. For example, assume a multiple message call is in progress and a CPE requests a connection to a server which is busy receiving control/status messages from the telephone switch. In this situation, the switch will provide, from the telephone network database, a security transaction with the CPE and since the CPE indicates a data call with "access code 1", the data call would be queued for delivery. The server would be informed of the data call and a data message would be delivered to the server at the end of the control/status message. At the end of the CPE data message, additional control/status messages or data messages may be sent to the server. In addition to queuing of calls, hunt groups or automatic call director techniques could be implemented.

Call Set Up, Information Transfer, & Call Disconnect

Call Set Up, Information Transfer, & Call Disconnect are Shown in FIGS. 16–20

(a) Call Set Up

The information required for the switch to communicate to the server mainly comes from information internally stored or generated in the telephone network.

Figure 16:
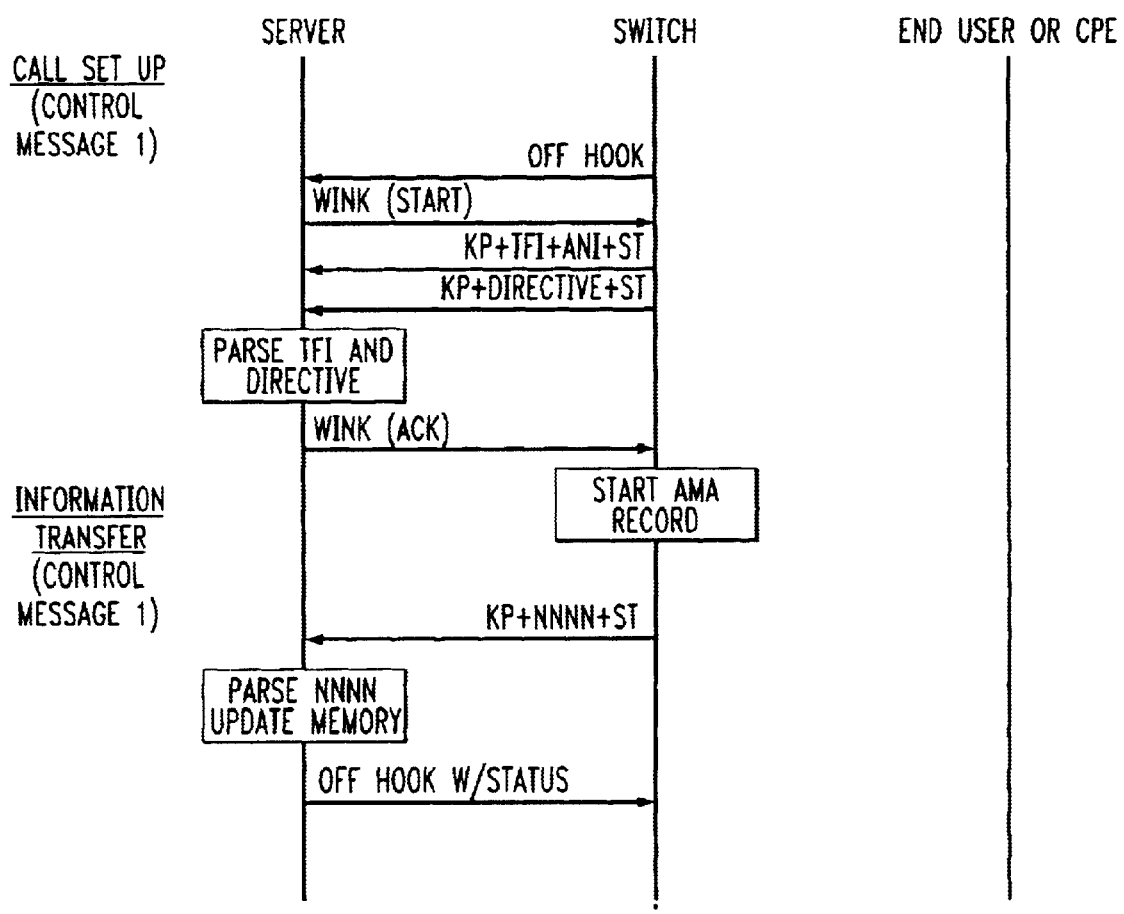
FIG. 16 is a signal flow diagram when the switch initiated communications with the server of the intelligent pathway control/status/data messages network initiated messages to server.
Figure 17:
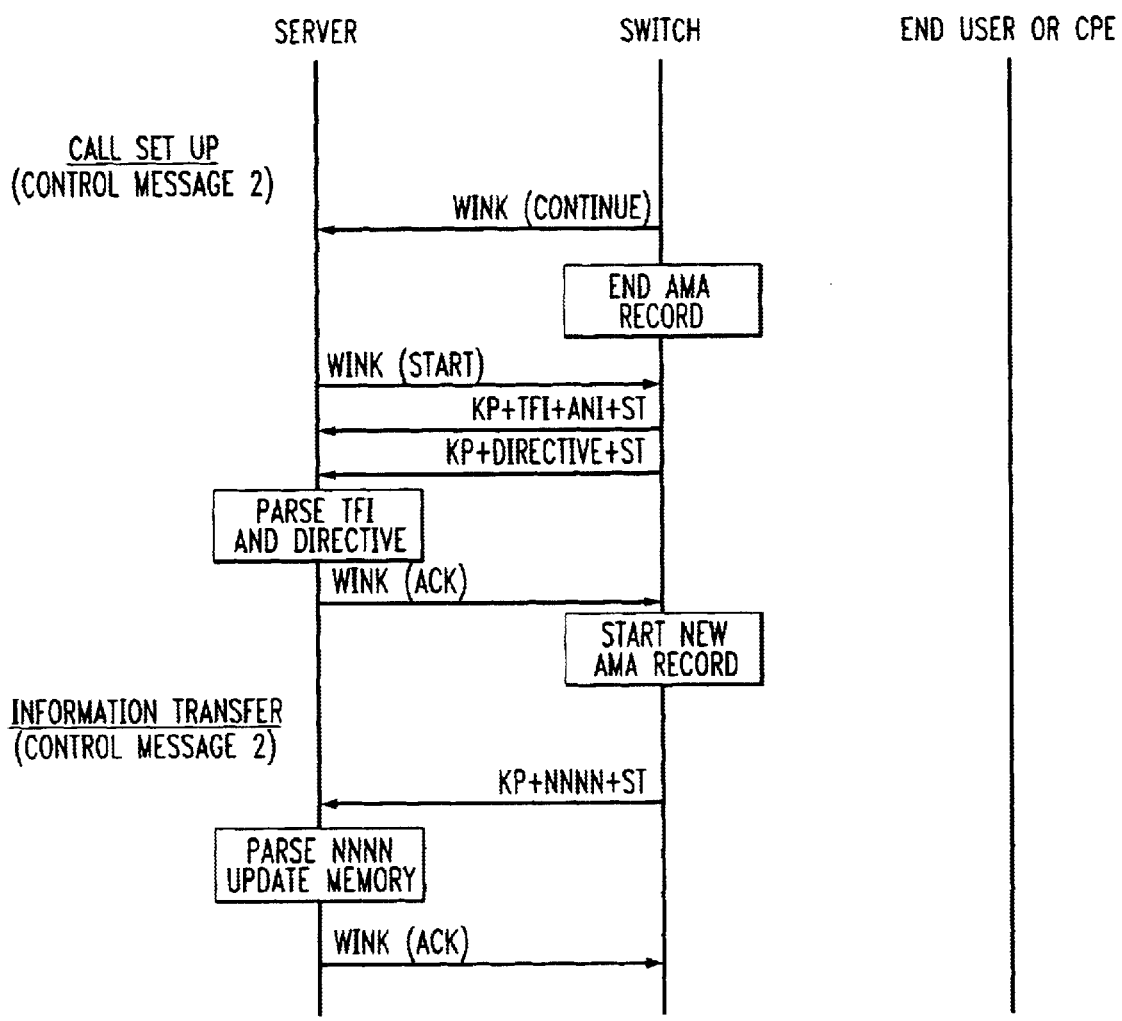
FIG. 17 is a signal flow diagram for call set up, information transfer and call disconnect of the intelligent pathway control/status/data messages network initiated messages to server.

As shown in FIG. 16, when the switch initiates communications with the server, the switch goes Off-Hook, seizes the Intelligent Pathway Trunk and, after a Wink (Start), outpulses the Intelligent Pathway Trunk protocol. The Intelligent Pathway Trunk protocol communicates to the server the function identifier (TFI), the telephone number to be billed (ANI), and the function to be performed (Directive). The server parses the information and acknowledges the successful parsing of the information with a Wink (Ack). At this point, the switch initiates an AMA record. As a result of an error recognized in the parsing or other processes, call processing tones may be returned to the switch in place of the Wink (Ack)

(b) Information Transfer

In response to the Wink (Ack), the switch transmits to the server the parameters of the function to be performed or the status to be reported (NNNN). The server parses the information and updates its memory or database, if necessary. The server acknowledges the successful parsing of the information with an Off-Hook signal to the switch. The server performs whatever actions are necessary, including informing the server of the resultant actions. The server may give a error signal to the switch in place of the Off-Hook signal.

(c) Additional Control or Data Messages

Additional control, status, or data messages may be presented to the server by the switch. Each message contains connect and information transfer information. An additional message from the switch to the server is preceded by Wink (continue). When sending this Wink to the server, the switch ends the AMA recording for the previous message. The server gives the switch a Wink (Start) signal and receives the Intelligent Pathway Trunk protocol information from the switch. After parsing the information, the server gives the switch a Wink (Ack) signal, the switch initiates a new AMA record (for this portion of the call). The information transfer phase is now entered for the second control message.

Figure 18:
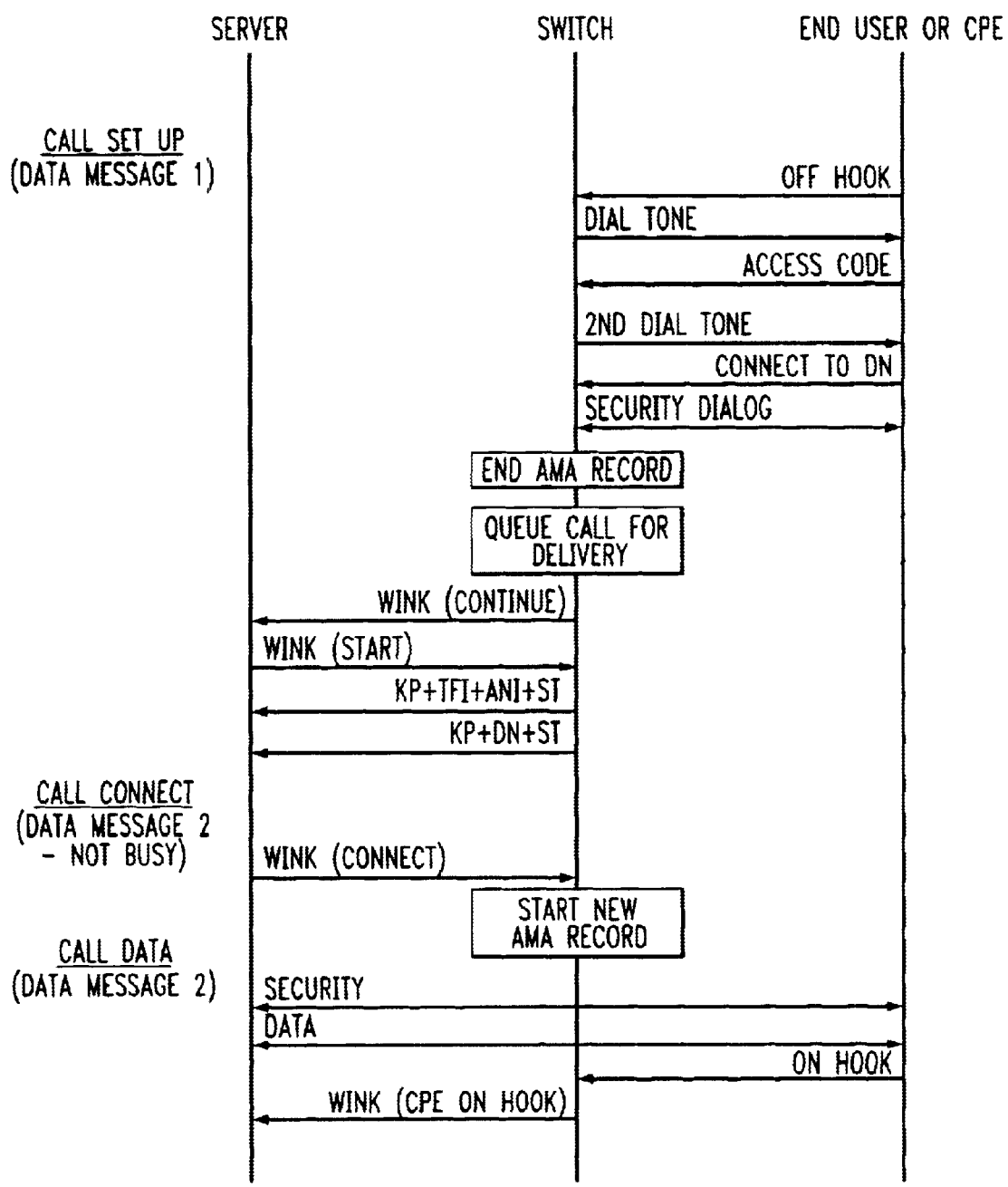
FIGS. 18–20 are signal flow diagrams of call set up, information transfer, call disconnect of the intelligent pathway control/status/data messages, CPE initiated messages to the network showing intermixing of data, control and status messages during one communications session.

As shown in FIG. 18, a data message from the switch to the server would occur when, during a server/switch session, a CPE would signal Off-Hook to the switch requesting service. The switch would present dial tone to the CPE, receive a data access code, the DN to connect to (server), and a sub-address, if necessary. This process is similar to that described for inbound calling. The switch would provide the security transaction, based on information stored in the switch or network data base, which would allow the CPE to continue the telemetry call. Since the CPE has designated the server DN, and that DN is busy on another message session, the new data call is queued for connection to the server DN when its current message session is complete. The amount of time the CPE can remain queued depends on internal CPE design parameters of how long the CPE can wait between giving address information and transmitting data.

Optionally, the new data call could be connected to a server DN hunt group or server DN automatic Call Distribution (ACD) capability. When the new data call is ready to be connected to the server DN, the switch ends the previous AMA record, and gives the server a Wink (Continue) signal. The server gives the switch a Wink (Start) signal and receives the Intelligent Pathway Trunk protocol information. In response to the Intelligent Pathway Trunk protocol information, the switch, if not connected already, begins a session with the server and indicates a data message is waiting. If server presents a Wink (Connect) to the switch which starts a new AMA record. The server signals a security dialog with the CPE which starts the data flow between the CPE and the server. When the CPE finishes its communications with the server, the CPE signals On-Hook to the switch. The switch signals a CPE on hook message to the server.

Figure 19:
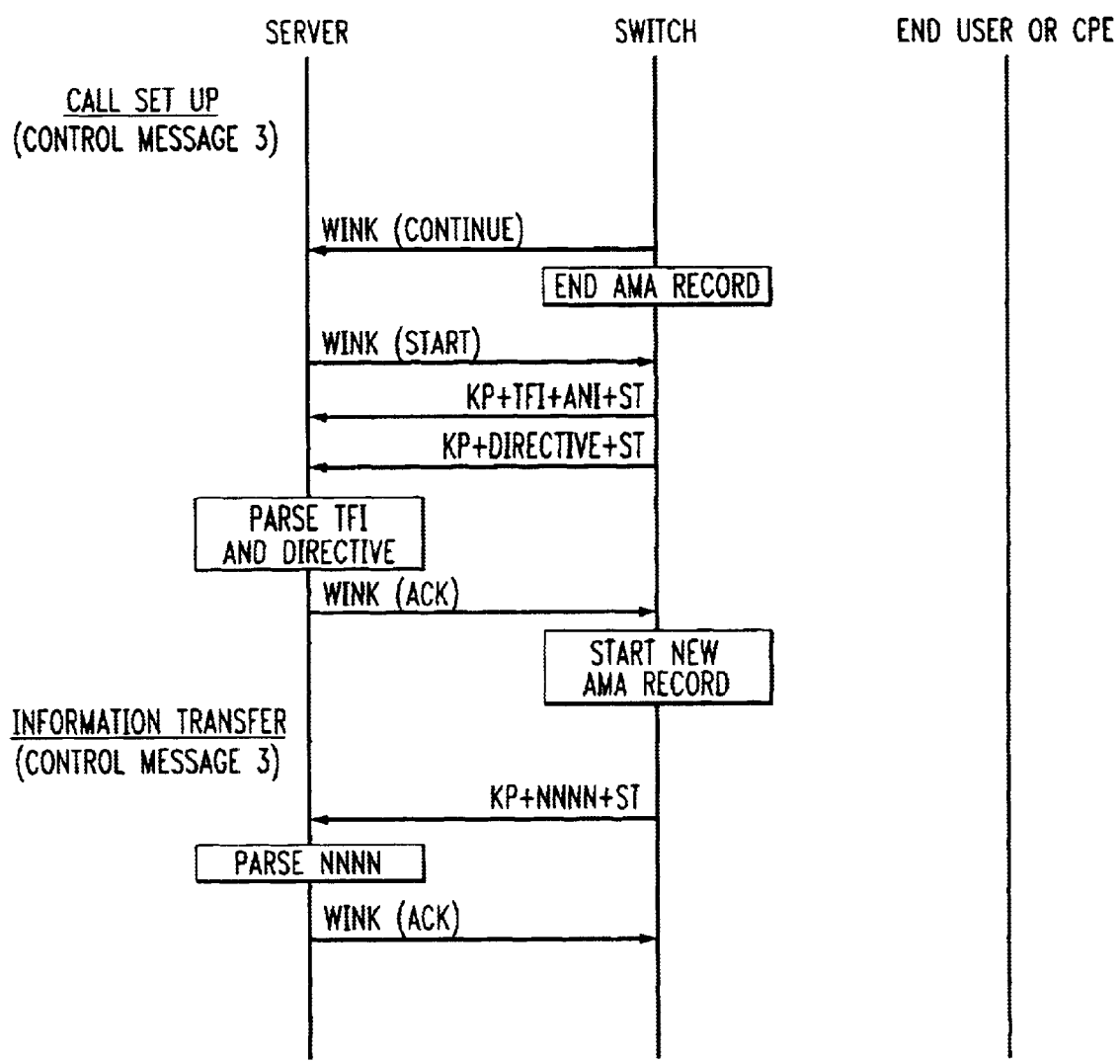
Figure 20:
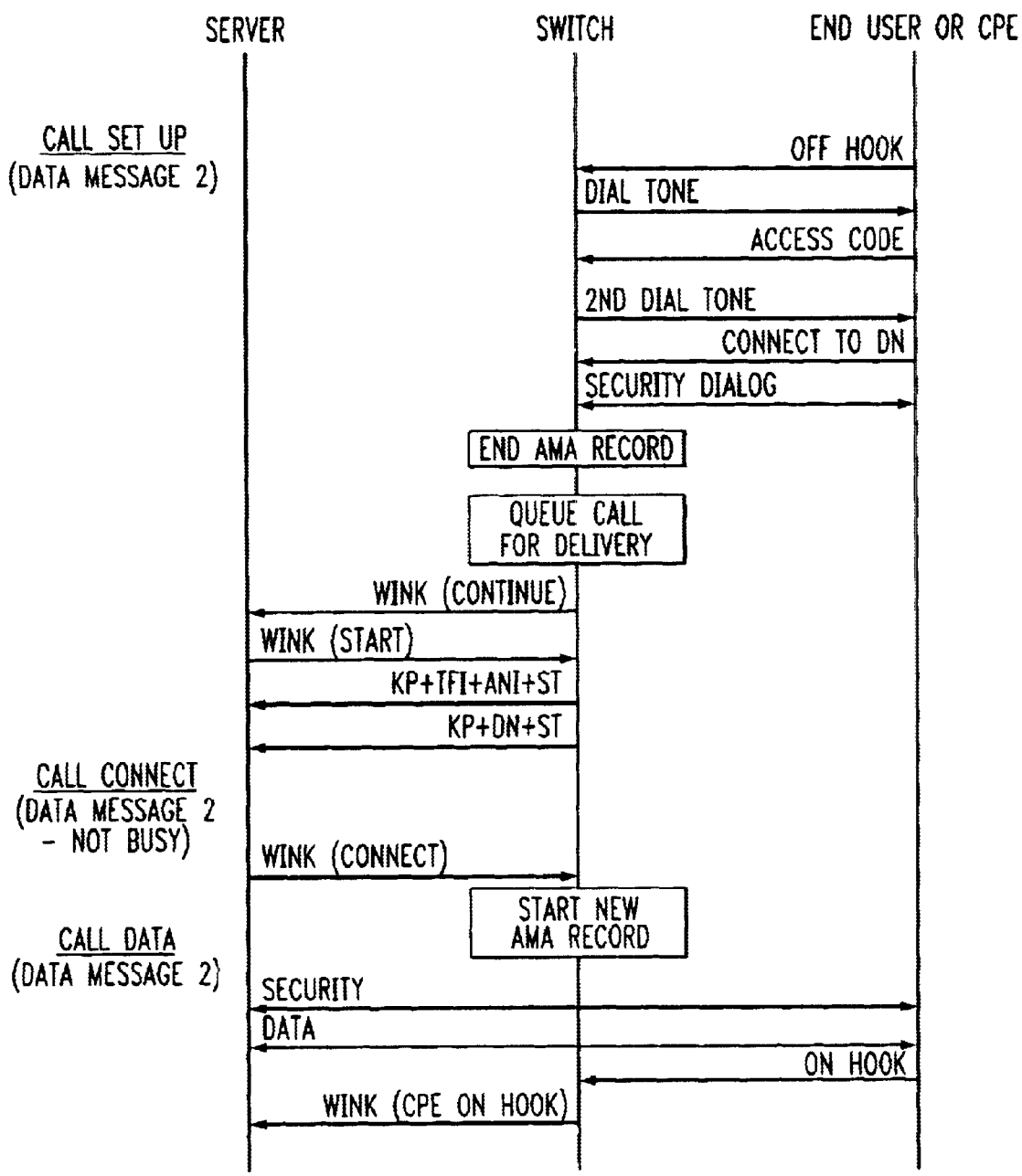

As shown in FIG. 19, the switch could continue to send control/status messages to the server.

(d) Call Disconnect

There are several conditions which will cause a disconnect of the telemetry call as described in earlier sections.

Disconnect by the Server

The server may disconnect by logging-off and going On-Hook. In this case, the server would signal On-Hook to the server. The server could continue the communications with the switch or end the communications by signaling On-Hook to the switch. The switch would return On-Hook to the server. If the server continued communications with the switch, additional messages may require the server to begin another session with the server.

Disconnect by the Server

At the termination of messages between the server and switch, the server would signal On-Hook to the switch. The switch goes On-Hook and ends the AMA record generation. The server may end the communications session with the server. If the communications continues, the server may have to connect to the switch at a later time.

Disconnect by the Switch

The switch may disconnect the call by ending the AMA record generation and signaling On-Hook to the server. The server signals On-Hook to the switch. The switch may end the communications with the server. If the communications continues, the switch may have to reinitiate communications with the server at a later time.

Disconnect by the End User going Off-Hook

If an end user goes Off-Hook during a data message call from the CPE, the normal telemetry disconnect rules apply. That is, the CPE would inform the server of the Off-Hook condition and become inactive. The server would initiate a disconnect of the end user's line. There are two disconnect options the server could take as discussed in an earlier section. The two options are for the server to signal the switch with a Wink (Continue) or to go On-Hook. In either case, the switch would disconnect the end user's line and proceed with the next message or signal On-Hook to the server.

Disconnect by the CPE going On-Hook

During a data message, the CPE may disconnect the call by going On-Hook. The switch will send an end of message signal to the server or go On-Hook. In either case, the switch would disconnect the end user's line. The server and switch could continue to exchange messages or the switch would go On-Hook depending on what signal was received.

CPE Initialed Messages to the Telephone Switch

Call Flow

Figure 21:
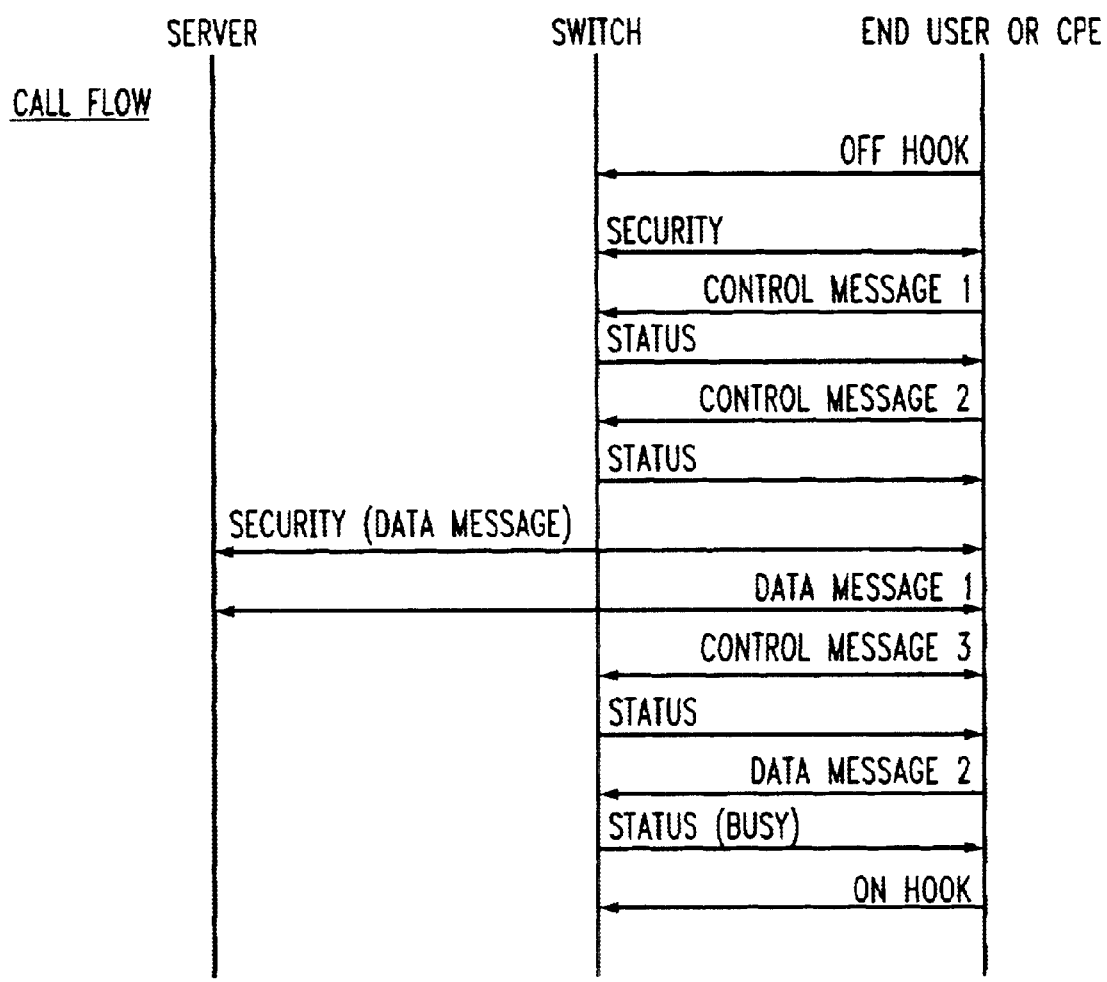
FIG. 21 is a signal flow diagram showing the CPE placing a call to the switch of the intelligent pathway control/status/data messages CPE initiated messages to network, showing intermixing of control, status and data messages to both the switch and the server.
Figure 22:
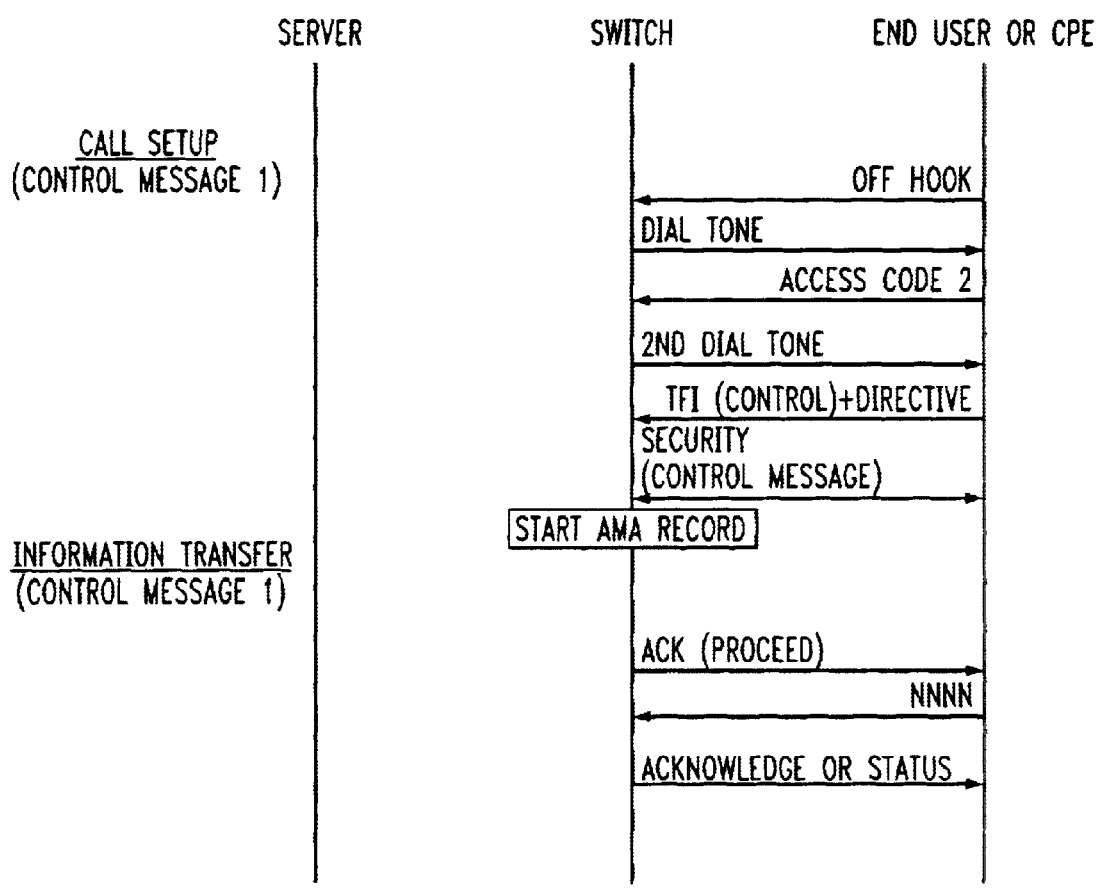
FIGS. 22–26 are signal flow diagrams of call set up, information transfer and call disconnect of the intelligent pathway control/status/data messages CPE initiated messages to network, showing intermixing of data, control and status messages initiated by the CPE.
Figure 23:
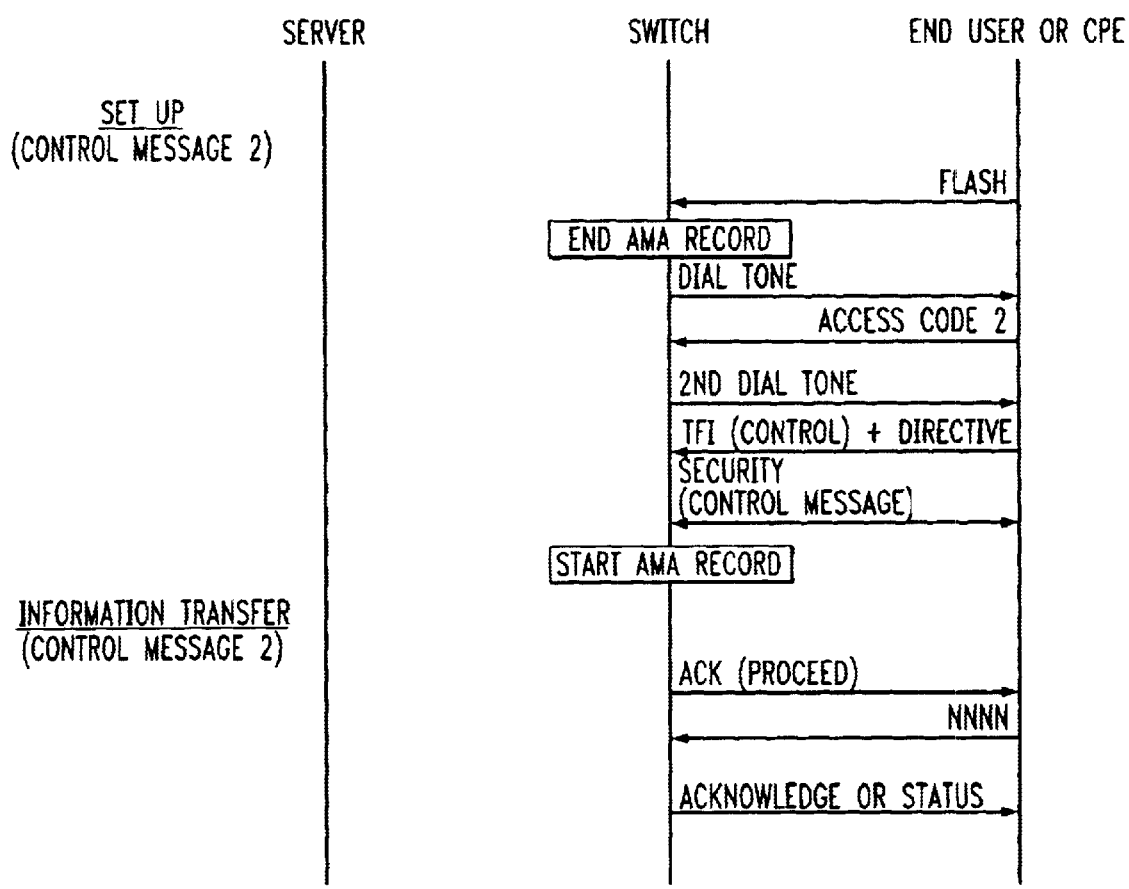
Figure 24:
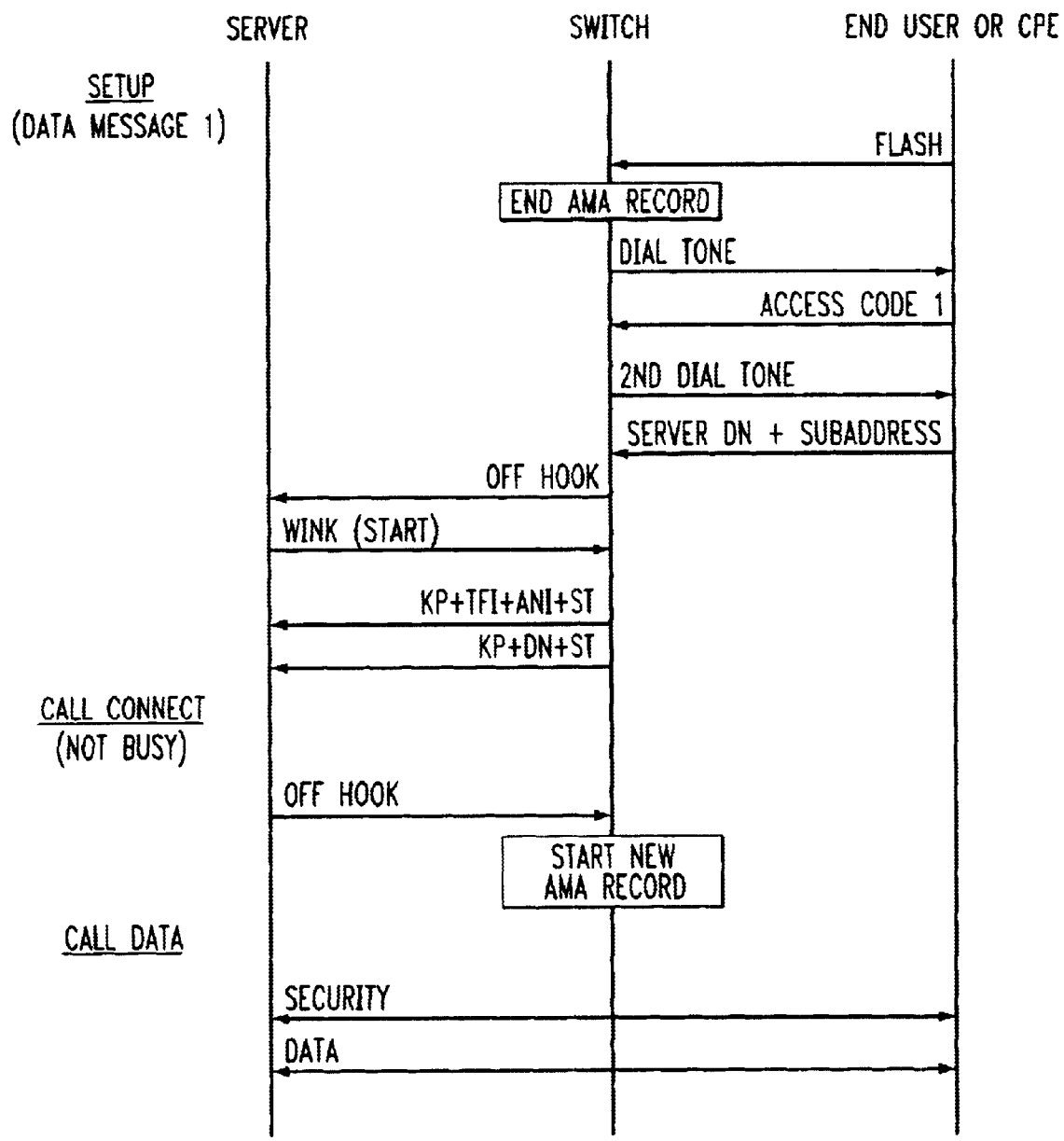
Figure 25:
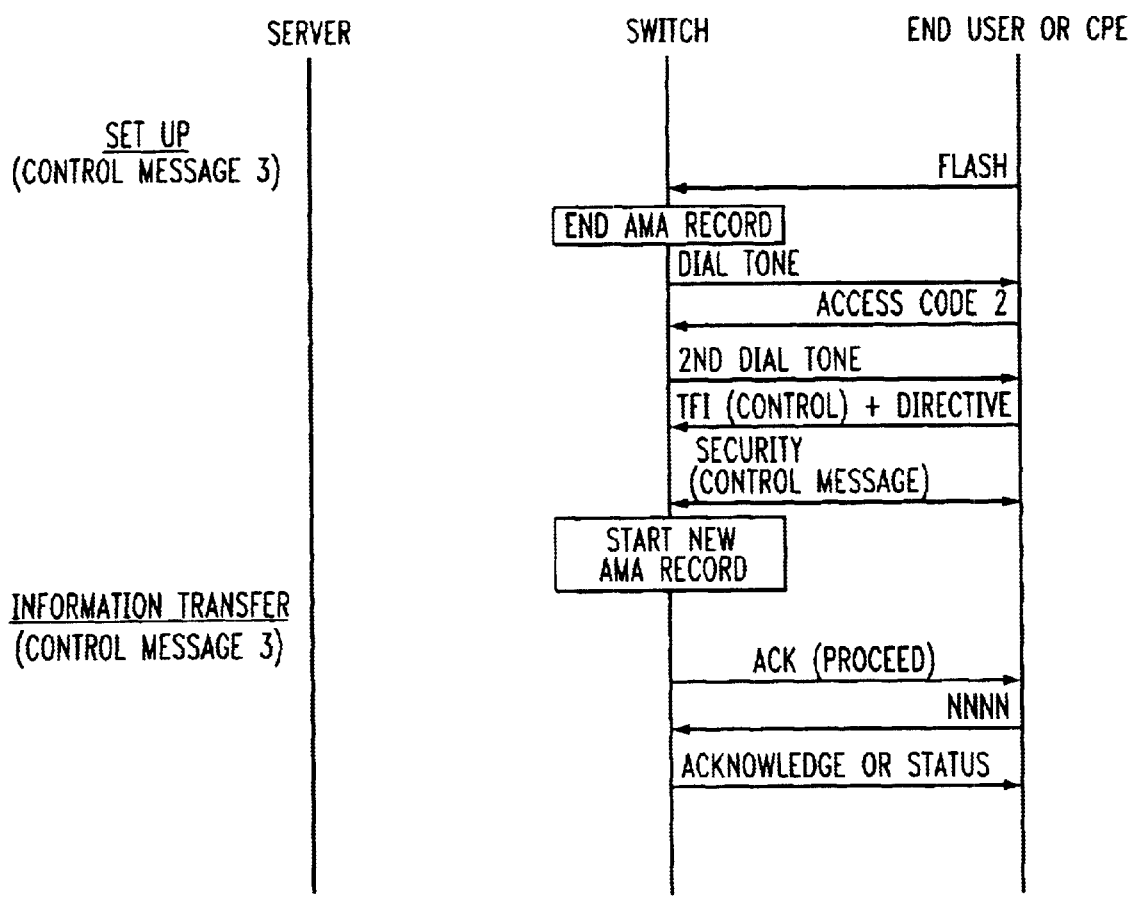
Figure 26:
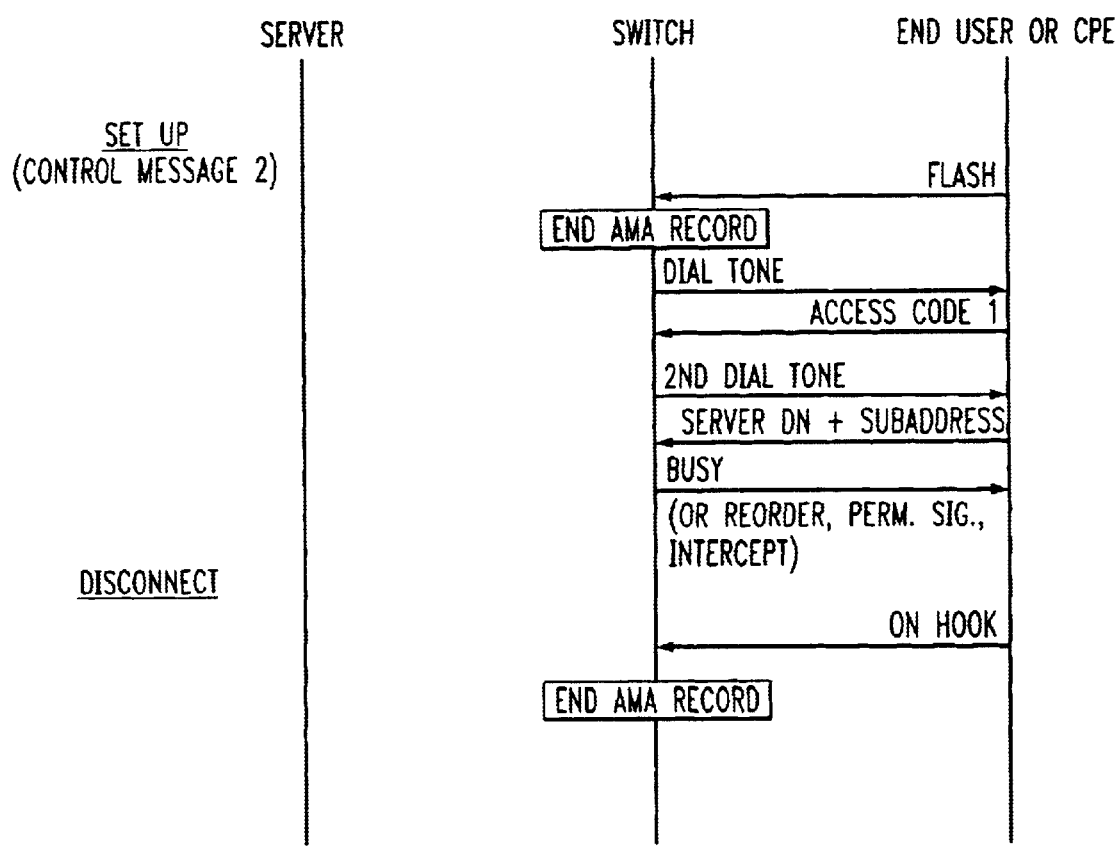

As shown in FIG. 21, the operation is described in terms of a CPE placing a call to the telephone switch. The end user may also initiate calls to the telephone switch to invoke the same functionality (assuming permissions) that the CPE may be invoking. In order for the telephone switch to differentiate between control/status messages and data messages, a different access code is implemented. For purposes of this disclosure, "access code 1" is used for data messages and "access code 2" is used for control/status messages. The end user thus has a two, or double, level database permissions which determine features available to the end user. In actual implementation, there may be several control message access codes each for different feature sets. In this manner, different tariffs can be applied to groups of feature capabilities as well as permissions (security) for use of features. Intermixing of Control/Status/Data messages takes place in a similar manner as described earlier.

Call Set Up, Information Transfer, & Call Disconnect

Call Set Up, Information Transfer, & Call Disconnect are shown in FIGS. 22 to 26

(a) Call Set Up

The CPE goes Off-Hook, receives dial tone, and presents an "access code 2", server DN (for data message), TFI (Control), and Directive (Control) to the telephone switch. The CPE goes through a security procedure to verify that the CPE is allowed to issue control/status messages to the telephone switch. The security procedure may include a dial back procedure, personal ID number (PIN), or other security technique. This security procedure would utilize information stored in the switch or network data base for authorization. The control message access code is a different access code than that used for a data call to a server. An AMA record is initiated and an Ack (proceed) is signaled to the CPE. The CPE may receive busy or other status signals in place of Ack (proceed).

(b) Information Transfer

Once the connection to the telephone switch is made, the CPE sends a control message with parameters, if necessary, to the telephone switch indicating what network element is to be acted upon. The control message may be acted upon by the telephone switch immediately or be acted upon at a later time. The CPE can be directly informed of an error condition within the control message session. The direct feedback would take the form of the telephone switch sending a status message back to the CPE which indicated success, busy, reorder (temporarily not available), permanent signal tone (not available) or any other status message. If message feedback is required at a later time perhaps due to a delay in accumulating the status information, the telephone switch will, if not already connected, initiate a call to the CPE. The initiation of a call to the CPE is described in another section.

(c) Additional Control Status or Data Messages

Multiple control and data messages may be sent to the telephone switch during the same call origination by the presentation of a continue signal. This continue signal is described as a flash but can be a Wink or a simple bit set in a field for digital applications. It is anticipated that control messages to the telephone switch will require a status or other message from the telephone switch back to the CPE. Multiple control messages to the telephone switch may be interspersed with multiple data messages to the server during the same call origination.

For a data message, if the telephone switch is not already connected, a session is established between the telephone switch and the server. This establishment has already been described in another section.

Multiple control/status and data messages may be sent to the server during the same call origination by the presentation of a continue signal.

(d) Call Disconnect

Call disconnect takes place as described in earlier sections of this application.

Network Initiated Messages to CPE

Call Flow

Figure 27:
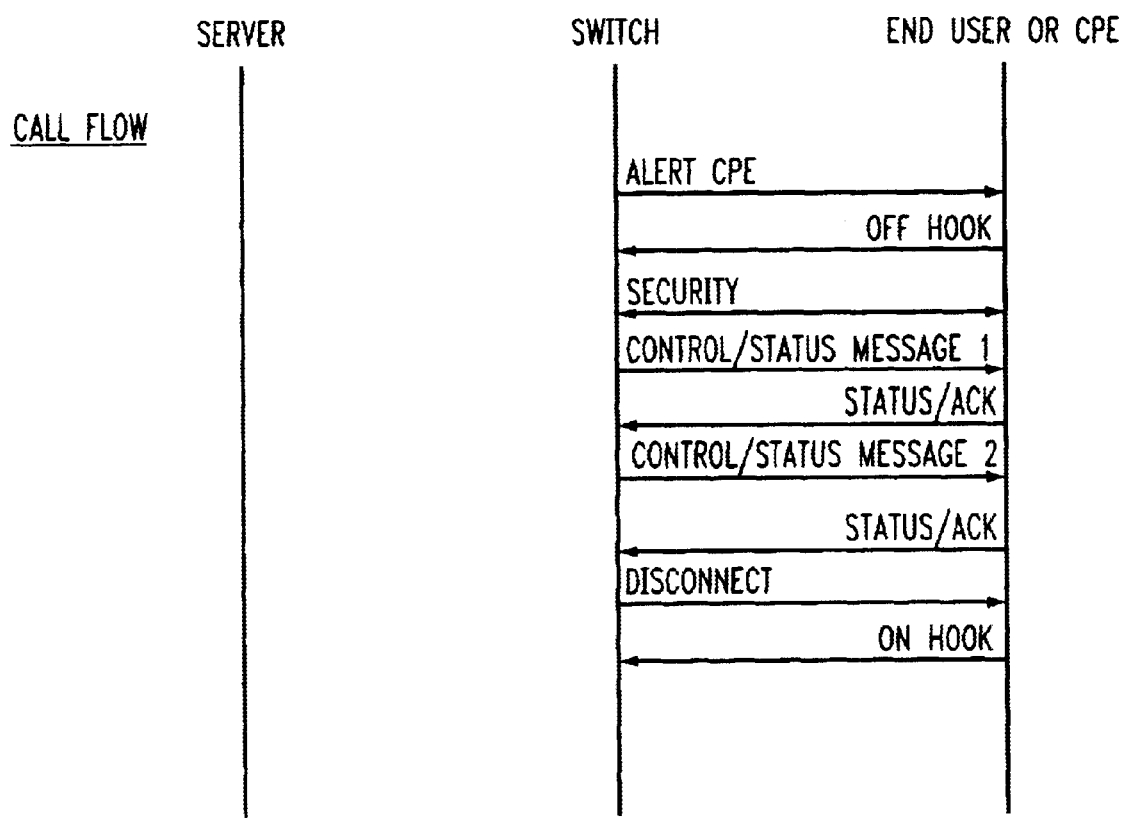
FIGS. 27–28 are signal flow diagrams showing the network switch initiating communications to the CPE of the intelligent pathway control/status/data messages network initiated messages to CPE.

As shown in FIG. 27, the switched telephone network (switch or server) may need to initiate calls to the CPE or end user to transfer control/status messages or to deliver a data message from a server.

Call Set Up, Information Transfer, & Call Disconnect

Figure 28:
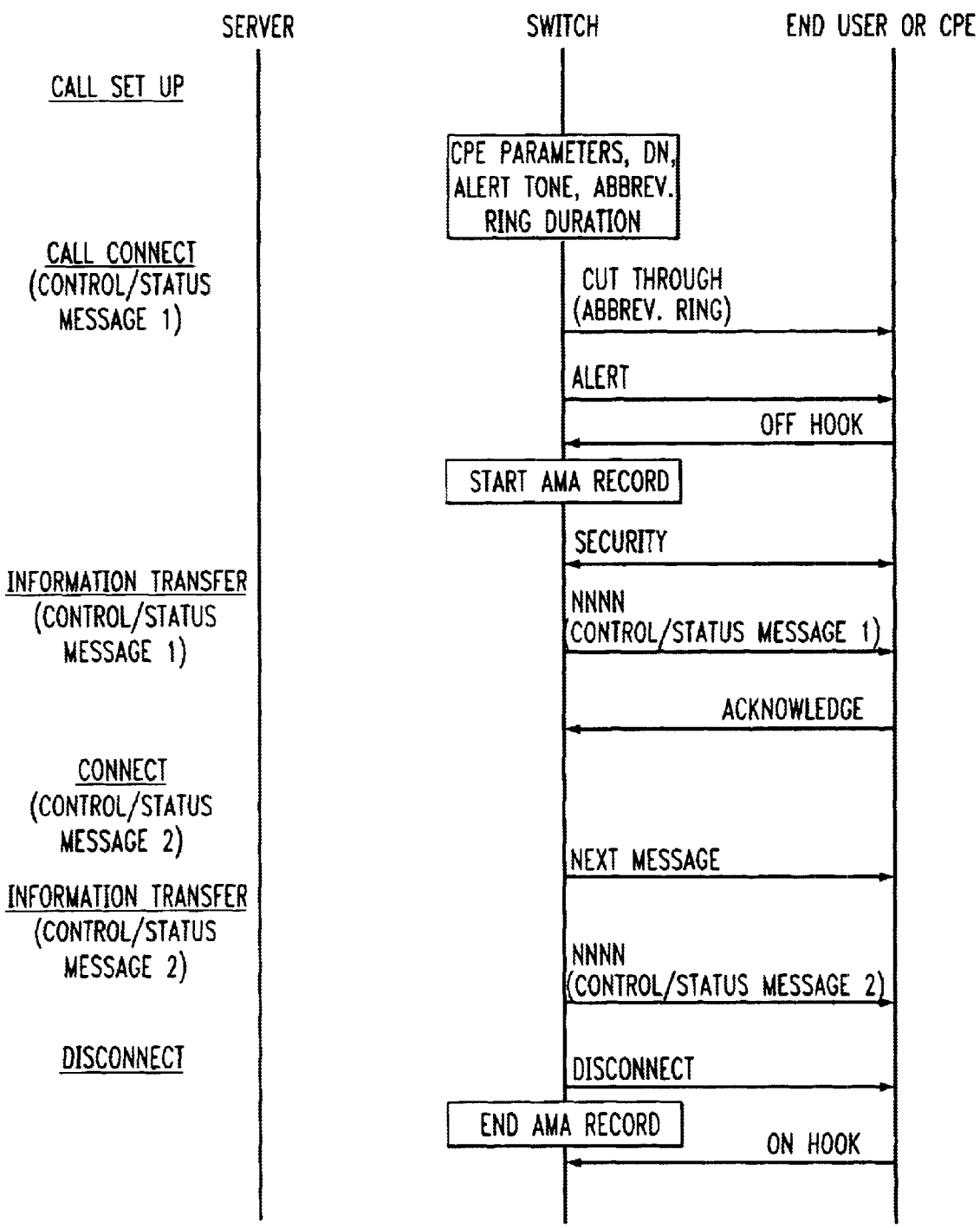

Call Set Up, Information Transfer, & Call Disconnect are shown in FIG. 28

(a) Call Set Up

The switch initiates a call to the CPE, cuts through, applies abbreviated ringing, if necessary, and alerts the CPE. The parameters for this call are stored in the switch or switched telephone network. The CPE signals Off-Hook and goes through a security dialog.

(b) Information Transfer

Single or multiple control/status messages are exchanged. Data messages may also be exchanged. Messages between the telephone switch and the CPE are separated by a next message command and, if appropriate, an acknowledgment.

(c) Additional Control or Data Messages

Additional control or data messages may be sent by the switch to the CPE preceded by a next message signal.

(d) Call Disconnect

The session is terminated by the telephone switch disconnecting from the line. The CPE or end user goes On-Hook. Alternatively, the CPE can terminate the call by signaling on hook to the switch.

Examples of Implementations

Expanded Utility Telemetry Trunk (UTT) Protocol

KP+TFI+ANI+(ST', ST", ST,'")

KP+DN/Directive+ST (ST', ST", ST,'")

KP+NNNN+ST where:

ST in the first string defines the existing basic UTT protocol

ST', ST", ST,'" in the first string represents the expanded protocol

TFI=Telemetry Function Identifier
composed of XX YYY ZZZZ digits
XX=99 switch alert codes
YYY=999 function codes

TABLE 1

TELEMETRY FUNCTION IDENTIFICATION
(TFI) - CPE ALERT CODES

| Alert Code | Alert Type | Application |
|---|---|---|
| 00 | No alert | Server alert, AMR |
| 01 | Power Ring | Voice Messaging |
| 02 | CPE On-Hook Alert Signal | New Dual Tone Alert for On-Hook CPE |
| 03–05 | Dual Tones | CPE (TIU) Off-Hook alert codes |
| 06–08 | Dual Tones | CPE (TIU) On-Hook alert codes |

TABLE 2

TELEMETRY FUNCTION IDENTIFICATION (TFI) - SWITCH FUNCTION CODES

| Function Code | Connect To | | Line Alert | | | Line Supervision | |
|---|---|---|---|---|---|---|---|
| | Idle Line | Busy Line | From switch To Phone | From switch To CPE | From Server To CPE | Off-Hook Supervision | No Supervision |
| 000 | X | — | — | — | X | — | X |
| 001 | X | — | — | X | — | X | — |
| 002 | X | — | — | X | — | X | — |
| 003 | — | — | — | — | — | — | — |
| 004 | X | — | — | X | — | X | — |
| 005 | X | — | — | X | — | X | — |
| 006 | — | — | — | — | — | — | — |
| 007 | — | — | — | — | — | — | — |
| 008 | X | — | X | — | — | X | — |
| 009 | X | — | X | — | — | X | — |
| 010 | — | X | — | — | X | — | X |
| 011 | — | X | — | X | — | — | X |
| 012 | — | X | — | X | — | — | X |
| 013 | — | X | — | X | — | — | X |
| 014 | — | X | — | X | — | — | X |
| 015 | — | X | — | — | — | — | X |
| 016 | — | X | — | — | — | — | X |

| Function Code | Additional Data String | Activate Sw Process After CPE Off-Hook | Applications |
|---|---|---|---|
| 000 | — | — | Telemetry, AMR, Server data to CPE |
| 001 | — | — | Server data to CPE, Oper Sys test of CPE |
| 002 | — | ADSI | Server data to CPE, Oper Sys test of CPE, ADSI |
| 003 | X | — | Load Broadcast List |
| 004 | X | — | Broadcast Server data to CPE |
| 005 | X | ADSI | Broadcast Server data to CPE/ADSI |

TABLE 2-continued

TELEMETRY FUNCTION IDENTIFICATION (TFI) - SWITCH FUNCTION CODES

| | | | |
|---|---|---|---|
| 006 | X | — | Broadcast success or failure report |
| 007 | — | — | Request broadcast status |
| 008 | — | — | Server Voice message to CPE |
| 009 | X | — | Server Broadcast Voice message to CPE Barge-In cases |
| 010 | — | — | Telemetry, AMR, Server data to CPE |
| 011 | — | — | Server data to CPE, Oper Sys test of CPE |
| 012 | — | ADSI | Server data to CPE, Oper Sys test of CPE, ADSI |
| 013 | X | — | Broadcast Server data to CPE |
| 014 | X | ADSI | Broadcast Server data to CPE/ADSI |
| 015 | — | — | Server Voice message to CPE |
| 016 | X | — | Server Broadcast Voice message to CPE |

ZZZZ=Up to 9 digits, in the range of 0 to 7. Each digit represents the first 3 bits of a binary string. The 9 digits combine to form a binary string of 27 bits representing 33, 554, 432 combinations to be used for device subaddressing. Each ST prime digit in the first protocol string would indicate the presence of the expanded protocol and would represent the presence of Z digits. For example, ST=basic telemetry. ST'=three Z digits present, ST"=six Z digits present, and ST'"=nine Z digits present. The variable amount of Z digits is to reduce the transmission time of the protocol string. In addition, Recent Change can be used to allow or not allow the presence or range of Z digits thereby making the protocol more efficient.

ANI=Billing Directory Number (no change from the existing telemetry protocol)

7/10 DN=Seven/Ten digit Directory Number to connect to (no change from the existing telemetry protocol)

Directive=This parameter will be used to identify a previously defined List identifier. For example, this parameter, in a broadcast capability, could identify the list of Directory Numbers to send the broadcast to. The parameter could also identify the list when the list is in put to the switch.

NNNN=A variable length string of information, which could be a message to be sent to the CPE, a list of Directory Numbers to be used in a broadcast message, or a function to be performed.

The protocol is described in terms of MF digits. If the third protocol string contains other than digits 0–9 (ASCII or binary data), a data link (I/O channel) may be required to input the information. This protocol can also be converted to any other digital switch input technique such as a primary rate interface (PRI) link.

Suppressed Ringing Trunk Protocol for Control/ Status Capability

Figure 29:
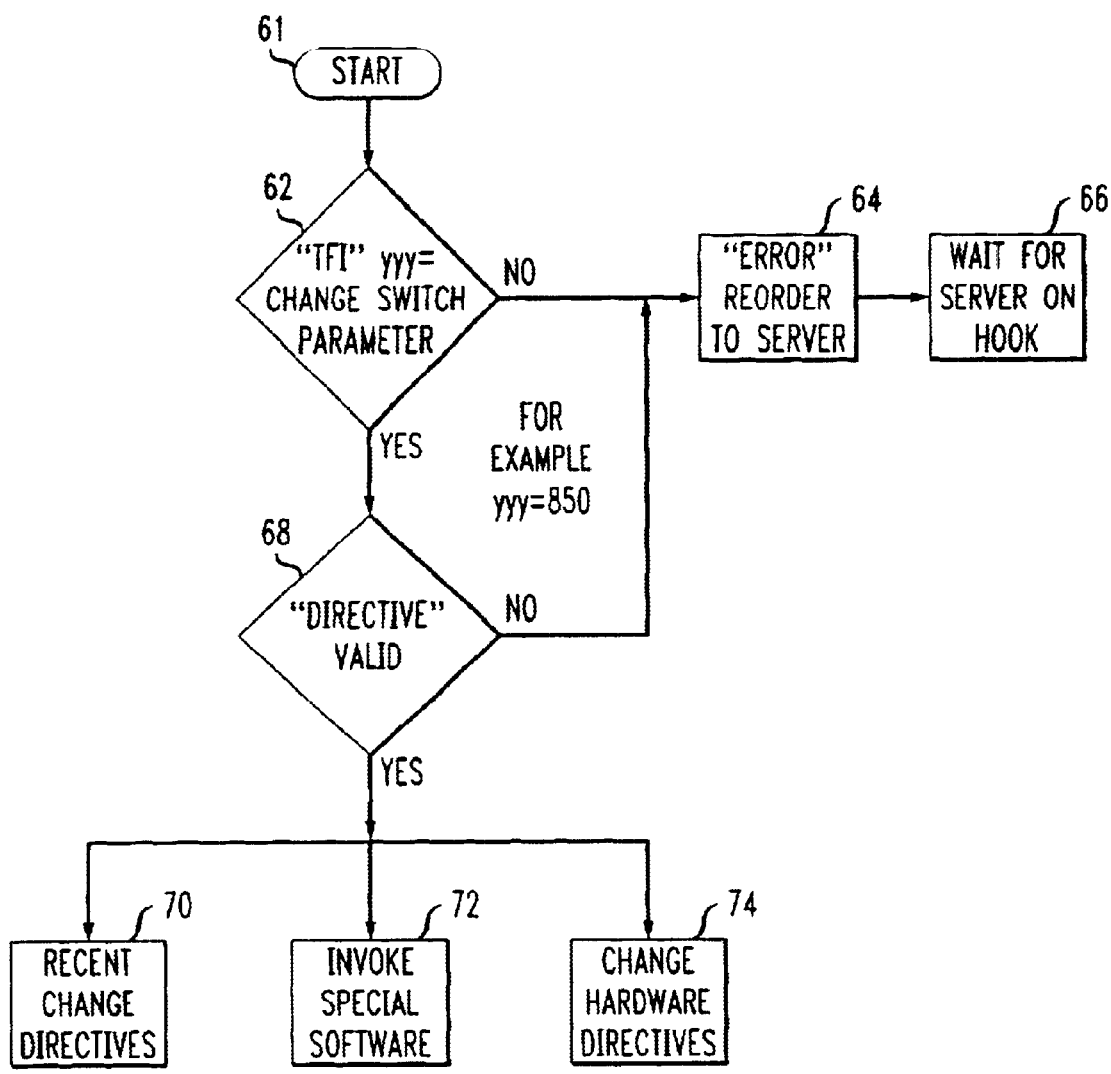
FIG. 29 is a flow chart of a parsing example of the intelligent pathway control/status/data messages.

A parsing example is shown in FIG. 29.

The Intelligent Pathway Trunk protocol is defined as:

KP+TFI+ANI+ST

KP+Directive+ST

KP+NNNN+ST

The method begins at step 61 where a telemetry function identifier (TFI) is defined that would identify control information to the telephone switch, the server, or the CPE.

In this case: TFI=XX YYY ZZZ where:

XX=no alert codes

YYY=Function code(s) to change switch parameters (i.e. 850)

ZZZ=Further identification of switch parameters

At step 62, if no change switch parameter is present the method proceeds to step 64 "Error" Recorder to server and then to step 66 Wait for Search On Hook. If at step 62 a change switch parameter is present, the method proceeds to step 68 where it is determined if the "Directive" is valid. If not valid the method proceeds to steps 64 and 66. If the Directive is valid then the method proceeds to steps, (for example), 70 recent change directives, 72 invoke special software and 74 change hardware directives, etc.

The Directive identifies what area of switch, server, and CPE are to change. For example:

30=Recent Change (switch administration)

35=Invoke special software

40=Attach special hardware (with software switch)

45=Change server parameters

50=Change server functionality

The NNNN would represent the data elements to be changed.

For example, to change recent change parameters refer to FIG. 28:

NNNN=aaa bbb ccc ddd where:

aaa=RC View number bbb=Key identifier (trunk group)

ccc=Field to be changed (default time)

ddd=Value for field (600 seconds)

Note:

(1) Although the Recent Change View number is used as a reference the most efficient method to change switch parameters is to change the switch memory directly.

(2) As an example, multiple fields could be changed at one time if the field list and value for fields were separated by commas (i.e. aaa1 bbb1 ccc ddd1, aaa2 bbb2 ccc2 ddd2).

For example, to invoke special software:

NNNN=aaa bbb ccc ddd where:

aaa=log calls software routine bbb=call screen (area code)

ccc=time of day (9–5)

ddd=other parameters

For example, to attach special hardware to a line (alarm sensor):

NNNN=aaa bbb ccc ddd where:

aaa=Hardware ID bbb=DN to monitor ccc=Other variables

Other protocols can be constructed based on the most efficient method of communications for the type of trunk that is being used. Also, instead of transmitting three signaling strings, a new signal string could be constructed that would put all parameters in the same information string:

For example:

KP+TFI+Directive+NNNN+ST

In this case the switch, after receiving the signaling string would go Off-Hook, parse the data, perhaps send an error message back to the server, and then go back On-Hook. This implementation is not limited to analog trunking. Digital techniques could carry similar control information and cause the same actions in the switch. Additionally, CCS7 information fields could be defined that would cause the same actions in the switch.

While a description of one embodiment of the invention has been given in detail it should be appreciated that the scope of the invention is not limited to such details but rather is defined by the appended claims.

What is claimed is:

1. A method for establishing a call between a customer station and a telephone switch in a suppressed ringing protocol environment comprising the step of:

transmitting control messages from the customer station to the telephone switch during data communications of the call to control a modification of one or more functional capabilities of the telephone switch;

wherein the modification of the one or more functional capabilities of the telephone switch occurs in the telephone switch;

wherein the telephone switch comprises one or more variables that control treatment of the call, wherein the modification of the one or more functional capabilities comprises a modification of the one or more variables of the telephone switch;

wherein the modification of the one or more variables of the telephone switch modifies a duration of the call.

2. The method as recited in claim 1 comprising the step of:

transmitting status messages from the telephone switch to the customer station which are indicative of a status of the one or more functional capabilities of the telephone switch.

3. The method as recited in claim 2 wherein the control messages are analog signals.

4. The method as recited in claim 2 wherein the control messages are digital signals.

5. The method as recited in claim 4 wherein the status messages are analog signals.

6. The method as recited in claim 2 wherein the customer station is a server.

7. The method as recited in claim 2 wherein the customer station is customer premises equipment.

8. The method as recited in claim 2 wherein the customer station is an end user.

9. The method as recited in claim 8 comprising the steps of:

providing a first code from the end user permitting the end user to control one or more of the functional capabilities; and providing a second code from the end user permitting the end user to provide data communications.

10. The method as recited in claim 2 wherein the step of transmitting status messages comprises the step of intermixing transmission of status messages and data messages during the call.

11. The method as recited in claim 2 comprising the step of transmitting multiple bi-directional control and status messages during the call.

12. The method as recited in claim 2 wherein the call is comprised of one or more of voice, data, control messages and status messages.

13. The method as recited in claim 1 comprising the steps of:

storing the functional capabilities in the telephone switch; and updating the functional capabilities when modified during the call.

14. The method as recited in claim 1 comprising the steps of:

storing the functional capabilities in a network database; and updating the functional capabilities when modified during the call.

15. The method as recited in claim 1 wherein the step of transmitting control messages comprises the step of transmitting one or more service requests to the telephone switch.

16. The method as recited in claim 1 comprising the steps of:

identifying when communications are terminated; and resetting the one or more functional capabilities of the telephone switch.

17. The method as recited in claim 1 wherein the one or more functional capabilities comprise a software feature for controlling an operation of the telephone switch.

18. The method as recited in claim 1 wherein the one or more functional capabilities comprise a hardware element for controlling a swap or change out of the hardware element.

19. The method as recited in claim 1 comprising the step of generating a billing record relating to the communications.

20. The method as recited in claim 19 wherein the step of generating a billing record comprises the step of generating the billing record based on each of the control messages received by the telephone switch during the communications.

21. The method as recited in claim 19 wherein the step of generating a billing record comprises the step of generating the billing record based on each of the status messages transmitted by the telephone switch during the communications.

22. The method as recited in claim 1 wherein the step of transmitting control messages comprises the step of intermixing transmission of control messages and data messages during the communications.

23. The method as recited in claim 1 wherein the control messages cause the telephone switch to activate or deactivate the one or more functional capabilities in the telephone switch.

24. The method as recited in claim 1, wherein the modification of the one or more variables of the telephone switch modifies a duration of an abbreviated ring signal of the call.

25. The method as recited in claim 1, wherein the modification of the one or more variables of the telephone switch modifies a maximum suppressed ringing call time of the call.

26. A method for establishing communications between customer premises equipment and a server through a switch unit having a protocol interface comprising the steps of:

establishing a communication link between the server and the protocol interface;

passing control messages from the server to the protocol interface to selectively modify functional capabilities of the switch unit associated with communications between the server and the customer premises equipment; and passing status messages representative of modifications in status of the switch unit resulting from the control messages from the switch unit and through the protocol interface to the server;

wherein the modifications in status of the switch unit comprises a modification to one or more functional capabilities in the switch unit;

wherein the switch unit comprises one or more variables that control treatment of the communications between the customer premises equipment and the server, wherein the modification of the one or more functional capabilities comprises a modification of the one or more variables of the switch unit;

wherein the modification of the one or more variables of the switch unit modifies a duration of the communications between the customer premises equipment and the server.

27. The method as recited in claim 26 wherein the control messages are analog signals.

28. The method as recited in claim 26 wherein the control messages are digital signals.

29. The method as recited in claim 26 wherein the modification to the functional capabilities of the switch unit comprises changing a software routine of the switch unit.

30. The method as recited in claim 26 wherein the modification to the functional capabilities of the switch unit comprises changing a hardware configuration of the switch unit.

31. The method as recited in claim 26 wherein the control messages comprise signals to alert the switch unit to be ready to receive additional control messages to perform one or more new functions during transmission of a data message.

32. The method as recited in claim 31 wherein the new functions are determined during the communications based on the status messages from the switch unit and data obtained from the customer premises equipment.

33. The method as recited in claim 26 comprising the step of conveying the control messages and the status messages between the protocol interface and the switch unit through an internal telephone network.

34. The method as recited in claim 26 comprising the step of intermixing control messages and status messages with data messages.

35. The method as recited in claim 26 comprising the step of having multiple bi-directional control and status messages during origination of the communications.

36. The method as recited in claim 26 wherein the communications comprise voice, data, the control messages and the status messages.

37. The method as recited in claim 26 comprising the step of providing separate billing records for the control messages and for the status messages.

38. The method as recited in claim 26 comprising the step of cueing data messages when a suppressed ringing trunk between the switch unit and the customer premises equipment is use.

39. The method as recited in claim 26 comprising the steps of:

determining if a first suppressed ringing trunk between the switch unit and the customer premises equipment is in use;

establishing the communication link over the first suppressed ringing trunk, if the first suppressed ringing trunk is not in use; and establishing the communication link over a second suppressed ringing trunk, if the first suppressed ringing trunk is in use.

40. The method as recited in claim 26 wherein the control messages cause the switch unit to activate or deactivate the one or more functional capabilities in the switch unit.

41. The method as recited in claim 26, wherein the modification of the one or more variables of the switch unit modifies a duration of an abbreviated ring signal of the communications between the customer premises equipment and the server.

42. The method as recited in claim 26, wherein the modification of the one or more variables of the switch unit modifies a maximum suppressed ringing call time of the communications between the customer premises equipment and the server.

43. A system for establishing communications comprising:

a telephone switch having functional capabilities for establishing suppressed ringing communications and for generating status messages representative of status of the functional capabilities; and a customer station for requesting that the telephone switch establish suppressed ringing communications and for generating control messages to control a modification of the functional capabilities of the telephone switch;

wherein the modification of the one or more functional capabilities of the telephone switch occurs in the telephone switch;

wherein the telephone switch transmits the status messages to the customer station in response to the control messages to indicate the modification of the functional capabilities;

wherein the telephone switch comprises one or more variables that control treatment of the suppressed ringing communications, wherein the modification of the functional capabilities comprises a modification of the one or more variables of the telephone switch;

wherein the modification of the one or more variables of the telephone switch modifies a duration of the suppressed ringing communications.

44. The system as recited in claim 43 wherein the customer station is a server.

45. The system as recited in claim 43 wherein the customer station is customer premises equipment.

46. The system as recited in claim 43 wherein the customer station is an end user.

47. The system as recited in claim 43 wherein the telephone switch comprises a software features program for modifying software capabilities of the telephone switch based on the control messages.

48. The system as recited in claim 43 wherein the telephone switch comprises a hardware control for modifying a hardware configuration of the telephone switch based on the control messages.

49. The system as recited in claim 43 wherein the control messages cause the telephone switch to activate or deactivate one or more of the functional capabilities in the telephone switch.

50. The system as recited in claim 43, wherein the modification of the one or more variables of the telephone switch modifies a duration of an abbreviated ring signal of the suppressed ringing communications.

51. The system as recited in claim 43, wherein the modification of the one or more variables of the telephone switch modifies a maximum suppressed ringing call time of the suppressed ringing communications.

* * * * *